US011625649B2

(12) United States Patent
Goldman et al.

(10) Patent No.: US 11,625,649 B2
(45) Date of Patent: Apr. 11, 2023

(54) AUTONOMOUS VEHICLE CONTROL USING SERVICE POOLS ACROSS DIFFERENT SERVICE ENTITIES

(71) Applicant: Uber Technologies, Inc., San Francisco, CA (US)

(72) Inventors: Brent Goldman, San Francisco, CA (US); Leigh Gray Hagestad, San Francisco, CA (US); Matthew James Way, Pittsburgh, PA (US)

(73) Assignee: Uber Technologies, Inc., San Francisco, CA (US)

(*) Notice: Subject to any disclaimer, the term of this patent is extended or adjusted under 35 U.S.C. 154(b) by 589 days.

(21) Appl. No.: 16/382,657

(22) Filed: Apr. 12, 2019

(65) Prior Publication Data

US 2019/0318277 A1    Oct. 17, 2019

Related U.S. Application Data

(60) Provisional application No. 62/729,053, filed on Sep. 10, 2018, provisional application No. 62/656,677, filed on Apr. 12, 2018.

(51) Int. Cl.
*G05D 1/00* (2006.01)
*G05D 1/02* (2020.01)
(Continued)

(52) U.S. Cl.
CPC ............ *G06Q 10/02* (2013.01); *G05D 1/0088* (2013.01); *G05D 1/0297* (2013.01); *G06Q 50/30* (2013.01);
(Continued)

(58) Field of Classification Search
CPC ..................................................... G01C 21/34
See application file for complete search history.

(56) References Cited

U.S. PATENT DOCUMENTS 9,552,564 B1     1/2017 Martenis
10,789,568 B2 *  9/2020 Greenberger ..... G06Q 10/08355
(Continued)

FOREIGN PATENT DOCUMENTS

CA           3096857        10/2019
CN         105843900 A  *   8/2016  ........... G06F 16/951
(Continued)

OTHER PUBLICATIONS

"Indicative," Merriam-Webster, Feb. 4, 2018 (Year: 2018).*
(Continued)

*Primary Examiner* — Omar Zeroual
*Assistant Examiner* — Brian Adams Heflin
(74) *Attorney, Agent, or Firm* — Schwegman Lundberg & Woessner, P.A.

(57) ABSTRACT

Systems and methods for controlling an autonomous vehicle and the service selection for an autonomous vehicle are provided. In one example embodiment, a computing system can obtain data indicative of a first vehicle service assignment for an autonomous vehicle. The first vehicle service assignment can be associated with a first service entity and indicative of a first vehicle service. The computing system can determine that the autonomous vehicle is available to perform a second vehicle service concurrently with the first vehicle service. The computing system can obtain data indicative of a second vehicle service assignment for the autonomous vehicle. The second vehicle service assignment can be associated with a second service entity that is different than the first service entity and is indicative of the
(Continued)

second vehicle service. The computing system can cause the autonomous vehicle to concurrently perform the first vehicle service with the second vehicle service.

19 Claims, 10 Drawing Sheets

(51) Int. Cl.
    *G08G 1/00*     (2006.01)
    *G06Q 10/02*     (2012.01)
    *G06Q 50/30*     (2012.01)

(52) U.S. Cl.
    CPC ..... *G08G 1/202* (2013.01); *G05D 2201/0213* (2013.01)

(56) References Cited

U.S. PATENT DOCUMENTS

| | | | |
|---|---|---|---|
| 2017/0294130 A1 | 10/2017 | Donnelly | |
| 2019/0317526 A1* | 10/2019 | Goldman | G06Q 10/0631 |
| 2020/0370899 A1* | 11/2020 | Laurent | G08G 1/202 |
| 2021/0223051 A1* | 7/2021 | Hochberg | G01C 21/3461 |

FOREIGN PATENT DOCUMENTS

| | | | |
|---|---|---|---|
| EP | 3776447 | | 2/2021 |
| JP | 2017220090 A | * | 12/2017 |
| WO | WO 2017/205961 | | 12/2017 |
| WO | 2019200053 | | 10/2019 |

OTHER PUBLICATIONS

"Uber to combine ride-sharing and delivery services," by Lucinda Southern, Nov. 25, 2015 (Year: 2015).*
"UberEats is Now Separate From Uber's App," by Michal Addady, Mar. 15, 2016 (Year: 2016).*
International Search Report and Written Opinion for PCT/US2019/026918, dated Jul. 16, 2019, 13 pages.
"International Application Serial No. PCT US2019 026918, International Preliminary Report on Patentability dated Oct. 22, 2020", 10 pgs.
"European Application Serial No. 19723245.7, Response to Communication pursuant to Rules 161(1) and 162 EPC filed May 28, 2021", 12 pgs.
"European Application Serial No. 19723245.7, Communication Pursuant to Article 94(3) EPC dated Jul. 20, 2022", 7 pgs.

* cited by examiner

| ORDER | VEHICLE SERVICE ASSIGNMENT | SERVICE ENTITY | COMPENSATION | LOCATION(S) | SERVICE TYPE | RIDERS | ITEMS | POOL? |
|---|---|---|---|---|---|---|---|---|
| (1) | VEHICLE SERVICE ASSIGNMENT A | SERVICE ENTITY 1 → 310A | $ | 1455 MARKET ST | DELIVERY | 0 | 1 LARGE BAG | YES |
| (2) | VEHICLE SERVICE ASSIGNMENT B | SERVICE ENTITY 2 → 310B | $$ | ORIG: HOTEL B DEST: TRAIN STA. | TRANSPORTATION | 1 | 1 SMALL BAG | YES |
| (3) | VEHICLE SERVICE ASSIGNMENT C | SERVICE ENTITY 3 → 310C | $$$$ | ORIG: ARENA DEST: HOTEL A | TRANSPORTATION | 2 | NONE | YES |
| (4) | VEHICLE SERVICE ASSIGNMENT D | SERVICE ENTITY 4 → 310D | $$$$ | ORIG: 37, -122 DEST: 37, -121 | DELIVERY | 0 | 4 LARGE BAGS | NO |
| (5) | VEHICLE SERVICE ASSIGNMENT E | SERVICE ENTITY 5 → 310E | $$ | ORIG: 10 BAY RD. DEST: STADIUM | TRANSPORTATION | 4 | 2 BAGS | NO |
| (N) | ... | ... | ... | ... | ... | ... | ... | ... |

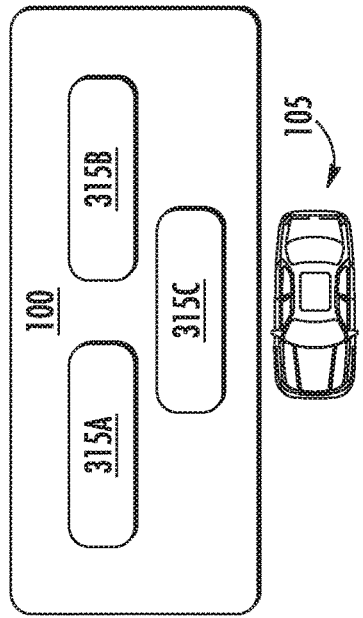

FIG. 3

AUTONOMOUS VEHICLE CONTROL USING SERVICE POOLS ACROSS DIFFERENT SERVICE ENTITIES

PRIORITY CLAIM

The present application is based on and claims priority to U.S. Provisional Application 62/656,677 having a filing date of Apr. 12, 2018 and U.S. Provisional Application 62/729,053 having a filing date of Sep. 10, 2018, all of which are incorporated by reference herein.

FIELD

The present disclosure relates generally to controlling autonomous vehicles and affecting the behavior of autonomous vehicles based on the selection of services performed by the autonomous vehicles.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for autonomous vehicle control. The method includes obtaining, by a computing system that includes one or more computing devices, data indicative of a first vehicle service assignment for an autonomous vehicle. The first vehicle service assignment is associated with a first service entity. The first vehicle service assignment is indicative of a first vehicle service. The method includes obtaining, by the computing system, data associated with the autonomous vehicle. The method includes determining, by the computing system, that the autonomous vehicle is available to perform a second vehicle service concurrently with the first vehicle service based at least in part on the first vehicle service assignment and the data associated with the autonomous vehicle. The method includes obtaining, by the computing system, data indicative of a second vehicle service assignment for the autonomous vehicle. The second vehicle service assignment is associated with a second service entity that is different than the first service entity. The second vehicle service assignment is indicative of the second vehicle service. The method includes causing, by the computing system, the autonomous vehicle to concurrently perform the first vehicle service of the first vehicle service assignment with the second vehicle service of the second vehicle service assignment.

Another example aspect of the present disclosure is directed to a computing system. The computing system includes one or more processors and one or more tangible, non-transitory, computer readable media that collectively store instructions that when executed by the one or more processors cause the computing system to perform operations. The operations include obtaining data indicative of a first vehicle service assignment for an autonomous vehicle. The first vehicle service assignment is associated with a first service entity. The first vehicle service assignment is indicative of a first vehicle service. The operations include determining whether the autonomous vehicle is available or is unavailable to perform a second vehicle service concurrently with the first vehicle service based at least in part on the first vehicle service assignment. The operations include, when it is determined that the autonomous vehicle is available to perform the second vehicle service concurrently with the first vehicle service, obtaining data indicative of a second vehicle service assignment for the autonomous vehicle. The second vehicle service assignment is associated with a second service entity that is different than the first service entity. The second vehicle service assignment is indicative of the second vehicle service. The operations include, when it is determined that the autonomous vehicle is unavailable to perform the second vehicle service concurrently with the first vehicle service, causing the autonomous vehicle to perform the first vehicle service of the first vehicle service assignment without concurrently performing the second vehicle service.

Yet another example aspect of the present disclosure is directed to an autonomous vehicle. The autonomous vehicle includes one or more processors and one or more tangible, non-transitory, computer readable media that collectively store instructions that when executed by the one or more processors cause the one or more processors to perform operations. The operations include obtaining data indicative of a first vehicle service assignment. The first vehicle service assignment is associated with a first service entity. The first vehicle service assignment is indicative of a first vehicle service. The operations include determining that the autonomous vehicle is available to perform a second vehicle service concurrently with the first vehicle service based at least in part on the first vehicle service assignment. The operations include obtaining data indicative of a plurality of candidate vehicle service assignments. At least one of the candidate vehicle service assignments is indicative of the second vehicle service. The operations include selecting a second vehicle service assignment for the autonomous vehicle based at least in part on one or more of the plurality of candidate vehicle service assignments. The second vehicle service assignment is associated with a second service entity that is different from the first service entity. The operations include causing the autonomous vehicle to concurrently perform the first vehicle service of the first vehicle service assignment with the second vehicle service of the second vehicle service assignment.

Other example aspects of the present disclosure are directed to systems, methods, vehicles, apparatuses, tangible, non-transitory computer-readable media, and memory devices for controlling autonomous vehicles and the selection of the vehicle services performed by the autonomous vehicles.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 3 depicts an example vehicle service assignment queue according to example embodiments of the present disclosure;

DETAILED DESCRIPTION

Figure 1:
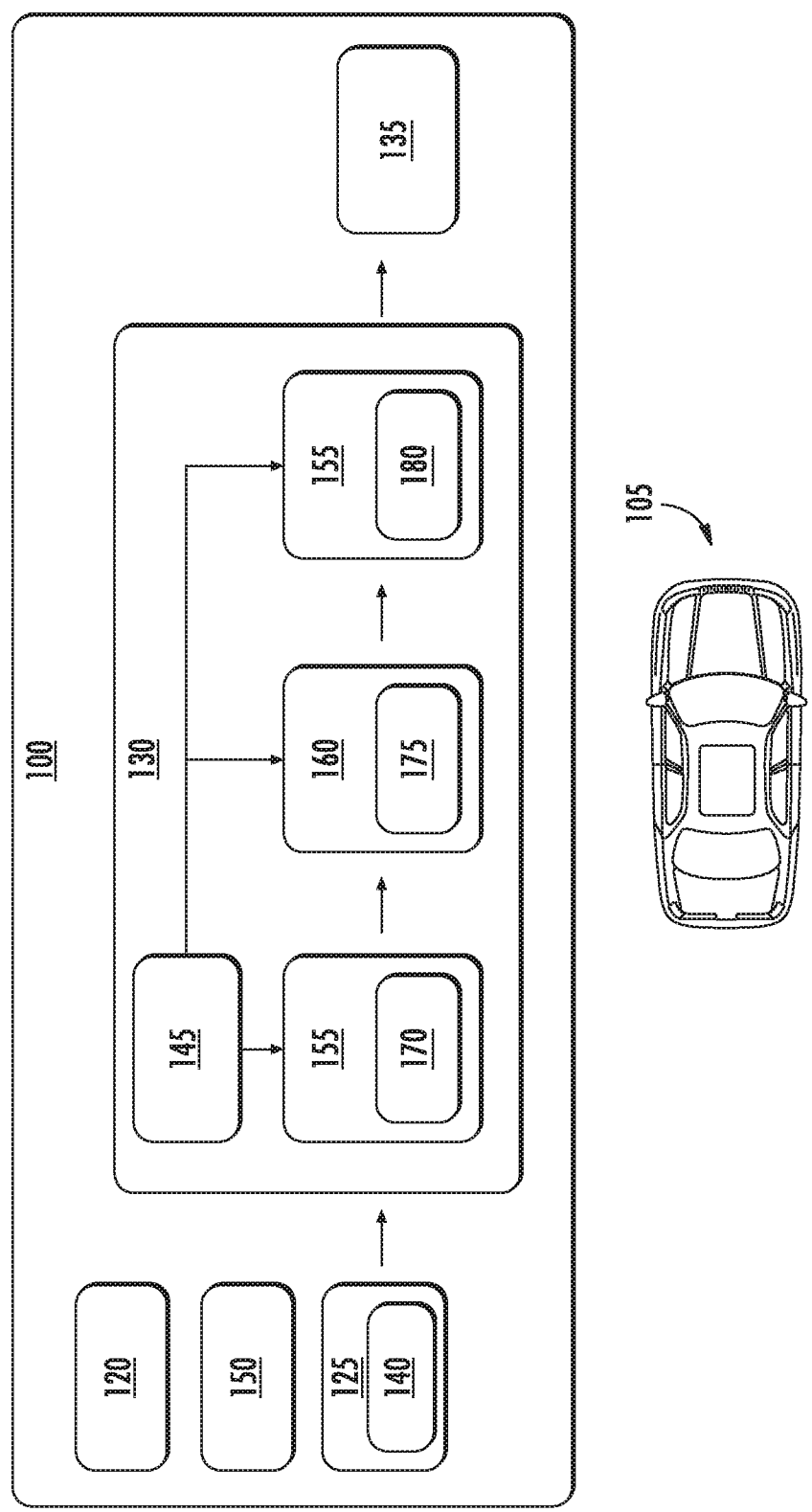
FIG. 1 depicts an example vehicle computing system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to enabling autonomous vehicles to concurrently perform vehicle services across different vehicle service entities. For instance, an autonomous vehicle can be utilized to perform vehicle services such as, for example, transportation services (e.g., rideshare services for users, etc.), delivery services (e.g., transportation of items for deliver, etc.), and/or other services. The vehicle service(s) can be offered (e.g., via a mobile software application, website, etc.) to users by several different service entities (e.g., companies that offer and/or coordinate the provision of vehicle services to users). In the event that a user requests a vehicle service, a computing system of the associated service entity can send a vehicle service assignment (e.g., a trip request) to an autonomous vehicle (e.g., via a computing platform associated with that service entity). The vehicle service assignment can include a request for the autonomous vehicle to perform the vehicle service for the user (e.g., travel to the user, transport the user, etc.) and a variety of information about the requested vehicle service (e.g., number of users, vehicle service type, location(s), time(s), etc.).

The systems and methods of the present disclosure allow an autonomous vehicle to perform vehicle services for two different service entities at the same time. For instance, an autonomous vehicle can accept a delivery request from a first service entity (e.g., that offers delivery services). Before and/or after the autonomous vehicle picks-up the item(s) to be delivered, the autonomous vehicle can determine whether it may be available to perform another vehicle service concurrently with the delivery service. For example, based on the vehicle's available capacity and/or other data (e.g., pick-up location, delivery location, potential travel route, etc.), the autonomous vehicle can determine whether it can accept another vehicle service assignment. If so, the autonomous vehicle can accept another vehicle service assignment such as, for example, a transportation request from a second service entity that is different than the first service entity. The autonomous vehicle can travel to pick-up the user(s) associated with the transportation request, while the item(s) to be delivered for the first vehicle service assignment are located in the trunk, and transport the user(s)/item(s) to their respective destinations. The autonomous vehicle can perform these services such that they are convenient for the users and the vehicle (e.g., minimizing processing, data storage usage, fuel/electricity consumption, etc.). In this way, an autonomous vehicle can create vehicle service pools across different service entities in a manner that allows the vehicle to efficiently utilize its computational resources, move via an improved/more efficient route that address a plurality of service assignments, and improve the overall autonomous behavior of the autonomous vehicle.

More particularly, an autonomous vehicle (e.g., ground-based vehicle, etc.) can include various systems and devices configured to control the operation of the vehicle. For example, an autonomous vehicle can include an onboard vehicle computing system for operating the autonomous vehicle (e.g., located on or within the autonomous vehicle). The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the vehicle to communicate with a computing system that is remote from the vehicle such as, for example, that of a service entity.

An autonomous vehicle can perform vehicle services for a plurality of different service entities. A service entity can be associated with the provision of one or more vehicle services. For example, a service entity can be an individual, a group of individuals, a company, a group of entities (e.g., affiliated companies), and/or other types of entities that offer and/or coordinates the provision of one or more vehicle services to one or more users. For example, a service entity can offer vehicle service(s) via a software application (e.g., on a user computing device), via a website, and/or via other types of interfaces that allow a user to request a vehicle service. As described herein, the vehicle services can include transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services. A user can provide (e.g., via a user device) a request for a vehicle service to an operations computing system associated with the service entity. The request can indicate the type of vehicle service that the user desires (e.g., a transportation service, a delivery service, a courier service, etc.), one or more locations (e.g., an origin, a destination, etc.), timing constraints (e.g., a pick-up time, a drop-off time, deadline(s), etc.), a number of user(s) and/or item(s) to be transported in the vehicle, other service parameters (e.g., a need for handicap access, etc.), and/or other information.

The operations computing system of the service entity can process the request and identify one or more autonomous vehicles that may be able to perform the requested vehicle services for the user. An autonomous vehicle can perform a vehicle service by, for example, travelling (e.g., traveling autonomously) to a location associated with the requested vehicle service, allowing user(s) and/or item(s) to board or otherwise enter the vehicle, transporting the user(s) and/or item(s), and allowing the user(s) and/or item(s) to deboard or otherwise exit the vehicle. In this way, the autonomous vehicle can provide the requested vehicle service(s) to the user. The operations computing system can communicate a vehicle service assignment indicative of the requested vehicle service(s) to an autonomous vehicle.

The operations computing system can communicate the vehicle service assignment to the autonomous vehicle via a computing platform associated with the service entity. The computing platform can provide the vehicle computing system and the operations computing system with a computing environment that allows the systems to communicate. For example, the computing platform can allow the operations computing system and the vehicle computing system to communicate via a network associated with the service entity. Each service entity may have a different computing platform that can allow the service entity's operations computing system and the vehicle computing system (and/or another computing system) to communicate via a telecommunications network system of the service entity.

One or more of the components of a computing platform can be accessible by the autonomous vehicle. For instance, to help communicate with the various different service entities, a vehicle computing system of an autonomous vehicle can include a plurality of vehicle clients, each associated with a different service entity. A vehicle client can be a software platform component of the service entity's computing platform that is stored onboard a vehicle. A vehicle client can allow the vehicle computing system to utilize a service entity's computing platform for communicating data to and/or obtaining data from the operations computing system associated with a service entity (e.g., a computing system that is remotely located from the vehicle). For example, a vehicle client can be implemented via hardware and/or software onboard the vehicle, such that the vehicle computing system can access an application programming interface associated with a service entity. The application programming interface can be utilized by the vehicle computing system to facilitate communications with the operations computing system. This can include, for example, the communication of data indicative of one or more vehicle service assignments.

The vehicle computing system can store one or more candidate vehicle service assignments in a vehicle service assignment queue (e.g., stored in the onboard memory of the autonomous vehicle). Each vehicle service assignment can include information associated with the requested vehicle service. Such information can include, for example, data indicative of the type of vehicle service requested (e.g., transportation service, delivery service, courier service, etc.), data indicative of the capacity required for the requested vehicle service (e.g., a number of users/items that are to occupy the vehicle, amount of cargo space needed for an item, a size/shape/type of an item, etc.), data indicative of one or more locations (e.g., origin location, destination location, intermediate location, etc.), data indicative of one or more time constraints (e.g., pick-up times, drop-off times, time limits for delivery, service duration, etc.), data indicative of one or more special service parameters (e.g., handle-with-care instructions, handicap access requests, etc.), data indicative of user preferences (e.g., whether the user is willing to participate in a service pool, etc.), data indicative of a compensation parameter (e.g., the compensation for delivering an item, transporting a user, etc.), data indicative of one or more vehicle service incentives (e.g., increased vehicle rating, etc.), data indicative of an order in which the vehicle service assignment was obtained by the autonomous vehicle, and/or other types of data. An autonomous vehicle can be configured to receive a plurality of different vehicle service assignments from a plurality of different service entities.

The vehicle computing system of an autonomous vehicle can be configured to pool different vehicle service assignments such that the autonomous vehicle can perform vehicle services for different service entities, at the same time. For instance, the vehicle computing system can obtain data indicative of a first vehicle service assignment. In some implementations, the vehicle computing system can access the vehicle service assignment queue to identify a first vehicle service assignment for the vehicle. If the queue is empty or the autonomous vehicle has yet to be activated for service, the vehicle computing system can go online with a plurality of different service entities (e.g., sign online to various service platforms/networks, establish different communication sessions with different operations computing systems, etc.) and indicate that the autonomous vehicle is available to perform a vehicle service.

The vehicle computing system can obtain data indicative of at least a first vehicle service assignment that is associated with a first service entity and is indicative of a first vehicle service. By way of example, the first vehicle service assignment can be a delivery request (e.g., made through a mobile app, etc.) that seeks to have the autonomous vehicle transport a package from a pick-up location to a destination location. The vehicle computing system can accept the first vehicle service assignment by directly or indirectly communicating data indicative of an acceptance to the operations computing system of the first service entity.

The vehicle computing system can determine whether or not the autonomous vehicle is available to perform one or more second vehicle services concurrently with the first vehicle service. This determination can be made before the autonomous vehicle accepts the first vehicle service assignment, after the autonomous vehicle accepts the first vehicle service assignment, before the autonomous vehicle begins to perform the first vehicle service (e.g., transport the item for delivery), and/or after the autonomous vehicle begins to perform the first vehicle service. As used herein, the concurrent performance of vehicles services refers to an autonomous vehicle performing one vehicle service for at least a portion of the time that the vehicle is performing another vehicle service. By way of example, the autonomous vehicle can transport a user/item for one vehicle service assignment during at least a portion of the time that the autonomous vehicle is transporting a user/item for another vehicle service assignment.

The vehicle computing system can determine whether the autonomous vehicle is available or is unavailable to perform one or more second vehicle services concurrently with the first vehicle service based at least in part on the first vehicle service assignment. For instance, the first vehicle service assignment can be indicative of the vehicle capacity required for the first vehicle service. This can include, for example, the size, shape, type, etc. of a package to be delivered. The first vehicle service assignment can also indicate the requested pick-up and drop-off locations for the package, a delivery deadline, as well as whether an associated user (e.g., a recipient of the package, etc.) is willing to allow the vehicle to concurrently perform another vehicle service while transporting the package. The vehicle computing system can analyze this data to determine whether the autonomous vehicle would be able to accept another vehicle service assignment. By way of example, even if the package would only require a limited amount of truck space, the vehicle computing system may determine that the autonomous vehicle cannot accept another vehicle service assignment if the delivery deadline is prohibitively short and/or the associated user has indicated a preference against vehicle service pooling.

Additionally, or alternatively, the vehicle computing system can obtain data associated with the autonomous vehicle to help determine whether the vehicle is available for another vehicle service assignment while performing the first vehicle service. For instance, the vehicle computing system can access data indicative of the vehicle's maximum capacity (e.g., from an onboard memory, remote computing system, etc.). The data indicative of the vehicle's maximum capacity can indicate the amount of storage space, the number of seats (with seat belts), the weight capacity, etc. of the autonomous vehicle. The vehicle can obtain this data before and/or after the vehicle starts performing the first vehicle service, to determine how much capacity is left in the vehicle for another potential vehicle service.

Additionally, or alternatively, the vehicle computing system can determine whether the vehicle is available for another vehicle service assignment based at least in part on sensor data. For instance, the vehicle computing system can obtain sensor data indicative of the available capacity of the autonomous vehicle. By way of example, after a package is loaded into the autonomous vehicle for the first vehicle service assignment, the vehicle computing system can obtain camera image data (e.g., from interior vehicle cameras) and/or weight sensor data (e.g., from onboard weight sensors). The vehicle computing system can process such sensor data to determine the amount of space within the vehicle's interior that is occupied by the package (e.g., by processing image data, weight sensor data, etc.), the amount of free space remaining within the vehicle's interior that is not occupied by the package, the amount of weight capacity occupied by the package, and/or the remaining available weight capacity of the vehicle. In some implementations, the vehicle computing system can obtain sensor data before the package is loaded into the autonomous vehicle in order to determine the vehicle's capacity prior to the loading of the package.

In the event that the vehicle computing system determines that the autonomous vehicle is unavailable to perform a second vehicle service concurrently with the first vehicle service, the vehicle computing system can proceed with the first vehicle service assignment. For instance, the vehicle computing system can cause the autonomous vehicle to perform the first vehicle service of the first vehicle service assignment without performing one or more second vehicle services. By way of example, the vehicle computing system can communicate one or more signals to the vehicle's control systems to cause the autonomous vehicle to initiate a motion control so that the autonomous vehicle can travel to a pick-up location to retrieve a package for the delivery request. The autonomous vehicle can deliver that package without providing any other vehicle services (e.g., without transporting any other user(s)/item(s)) while doing so.

In the event that the vehicle computing system determines that the autonomous vehicle is available to concurrently perform the second vehicle service(s) with the first vehicle service, the vehicle computing system can obtain data indicative of one or more second vehicle service assignments. The second vehicle service assignment(s) can be associated with one or more second service entities that are different than the first service entity associated with the first vehicle service assignment. The second vehicle service assignment(s) can be indicative of second vehicle service(s) that can be the same as or different from the first vehicle service. For example, the first vehicle service and a second vehicle service can both be a delivery service, transportation service, etc. In another example, the first vehicle service can be a delivery service (e.g., retrieving item(s) for delivery), while the second vehicle service can be a transportation service (e.g., transporting user(s) from one geographic point to another).

The vehicle computing system can evaluate the second vehicle service assignment(s) to determine whether any of them fit the available capacity of the autonomous vehicle while it is also addressing a first vehicle service assignment. For example, in some implementations, the vehicle computing system can access the vehicle service assignment queue associated with the autonomous vehicle (e.g., stored in an onboard memory and/or an offboard memory). As described herein, the vehicle service assignment queue can include data indicative of a plurality of candidate vehicle service assignments. Each of the candidate vehicle service assignments can be indicative of the second vehicle service(s). The vehicle computing system can analyze one or more of the candidate vehicle service assignments to determine whether the autonomous vehicle can accept any of the candidate vehicle service assignments based at least in part on the vehicle's available capacity. By way of example, the vehicle computing system can determine that a package to be delivered in accordance with a first vehicle service assignment would occupy the vast majority of the trunk space of the vehicle. The vehicle computing system can determine (e.g., based on known capacity information, sensor data, etc.) that the autonomous vehicle still has four passenger seats available for a second vehicle service (e.g., to transport user(s), another item, etc.). The vehicle computing system can review the candidate vehicle service assignments of the vehicle service assignment queue to see if any of the candidate service assignments require four (or fewer) passenger seats. For example, the vehicle computing system may identify a candidate vehicle service assignment that requests the transportation of two adult users and, thus, could be performed with the first vehicle service (e.g., the package delivery service). In some implementations, the vehicle computing system can also evaluate the location(s) and/or other information associated with the candidate vehicle service assignment(s) in order to ensure that the performance of a second vehicle service would be efficient for the autonomous vehicle (and convenient for the user(s) associated with the first vehicle service assignment).

Additionally, or alternatively, the vehicle computing system can obtain data indicative of one or more second vehicle service assignments from one or more remote computing systems. For instance, in the event that the vehicle's service assignment queue is empty or none of the candidate vehicle service assignments in the queue fit the vehicle's available capacity, the autonomous vehicle can communicate its availability to one or more service entities. In response, the respective operations computing systems of those service entities can communicate data indicative of one or more candidate vehicle service assignments to the vehicle computing system for consideration.

The vehicle computing system can continue to review (and/or accept) candidate vehicle service assignments until the vehicle computing system determines that no additional candidate vehicle service assignment fits the vehicle's available capacity or that the autonomous vehicle has no remaining capacity. In the event that the vehicle computing system is unable to identify a second vehicle service assignment that fits the vehicle's available capacity, the autonomous vehicle may proceed to perform the first vehicle service (without currently performing any other vehicle services).

In the event that the vehicle computing system is able to identify a second vehicle service assignment that fits the vehicle's available capacity, the vehicle computing system can accept the second vehicle service assignment. Accordingly, the vehicle computing system can cause the autonomous vehicle to concurrently perform the first vehicle service of the first vehicle service assignment with the second vehicle service of the second vehicle service assignment. This can include causing the autonomous vehicle to initiate a motion control in accordance with the first vehicle service assignment and the second vehicle service assignment. By way of example, the vehicle computing system can cause the autonomous vehicle to autonomously navigate to a first pick-up location to retrieve a package to be delivered in accordance with the first vehicle service assignment. After the package has been placed inside the autonomous vehicle, the vehicle computing system can cause the autonomous vehicle to travel to a second pick-up location to allow one or more users to board the vehicle to be transported in accordance with the second vehicle service assignment. The route to pick-up the user(s) for the second vehicle service assignment can be in the general direction of a drop-off location for the package so that the autonomous vehicle can travel in an efficient manner. The autonomous vehicle can navigate to drop-off the package before dropping-off the user(s) or vice versa, whichever is more efficient with respect to the vehicle's resources (e.g., fuel, data storage, etc.), any stated timelines (e.g., delivery deadlines, etc.), incentives, compensation, and/or passenger preferences. The vehicle computing system can then navigate the autonomous vehicle to drop-off whichever of the item(s) or user(s) are remaining in the vehicle. In some implementations, the vehicle computing system can determine whether the autonomous vehicle is available to perform another vehicle service (e.g., build another service pool) before dropping off the remaining item(s) or user(s). As such, the vehicle computing system can continuously attempt to build vehicle service pools for the autonomous vehicle.

The systems and methods described herein provide a number of technical effects and benefits. For instance, the systems and methods of the present disclosure allow an autonomous vehicle to build service pools across different service entities (and their related service platforms). This can provide an autonomous vehicle with the ability to consistently perform vehicle services as well as the flexibility to do so for different service entities. For example, an autonomous vehicle can continue to try to build efficient vehicle service pools as it travels to address a current vehicle service assignment. In this way, the autonomous vehicle is able to customize its performance of vehicle services in a manner that leads to less vehicle downtime.

Moreover, the systems and methods of the present disclosure allow an autonomous vehicle to receive vehicle service assignments across a multitude of different service platforms, which in turn provides the autonomous vehicle with a greater ability to select vehicle service assignments that are geographically proximate. This can allow the autonomous vehicle to save processing and memory resources as the autonomous vehicle navigates a more well-known geographic area. Additionally, this can allow an autonomous vehicle to more easily build the service pools described herein, again leading to less vehicle downtime.

Example aspects of the present disclosure can provide an improvement to vehicle computing technology, such as autonomous vehicle computing technology. For instance, the systems and methods of the present disclosure provide an improved approach for an autonomous vehicle to pool vehicle service(s) from among a plurality of different service entities and/or vehicle service assignments. For example, a computing system (e.g., a vehicle computing system) can obtain data indicative of a first vehicle service assignment for an autonomous vehicle. The first vehicle service assignment can be associated with a first service entity and indicative of a first vehicle service (e.g., a delivery service). The vehicle computing system can accept the first vehicle service assignment. Before and/or after such acceptance, the vehicle computing system can determine whether the autonomous vehicle is available to perform a second vehicle service concurrently with the first vehicle service based at least in part on the first vehicle service assignment. In some implementations, the vehicle computing system can also make this determination based at least in part on data associated with the autonomous vehicle (e.g., capacity specifications, sensor data, etc.). In the event that the autonomous vehicle is available to perform a second vehicle service, the vehicle computing system can obtain data indicative of a second vehicle service assignment for the autonomous vehicle. The second vehicle service assignment can be associated with a second service entity that is different than the first service entity and the second vehicle service assignment can be indicative of the second vehicle service (e.g., a transportation service). The vehicle computing system can cause the autonomous vehicle to concurrently perform the first vehicle service of the first vehicle service assignment with the second vehicle service of the second vehicle service assignment. In this way, the autonomous vehicle can more efficiently utilize its computational resources to perform various vehicle services across different service entities. For example, by building service pools across different entities, the autonomous vehicle is able to utilize more efficient routes than if the autonomous vehicle was confined to one service entity. This can lead to preservation of onboard processing resources, memory resources, fuel resources, electric charge resources, etc.

Furthermore, the technology of the present disclosure provides a technical improvement to the navigation and motion control of an autonomous vehicle. As enabled by the present technology, the autonomous vehicle is able to plan and traverse an improved vehicle route that allows the autonomous vehicle to concurrently address two different vehicle service assignments. For instance, the autonomous vehicle can initiate a motion control such that the autonomous vehicle traverses a route by which the autonomous vehicle can arrive at the origin location(s) for the first and second vehicle service assignments as well as the destination location(s) for the first and second vehicle service assignments. While the respective origin and/or destination location(s) may differ from one another, the intermediate waypoints along the route for completing the two vehicle service assignments include at least some overlap. In this way, the motion of the autonomous vehicle can be controlled in a manner (e.g., via the at least somewhat overlapping route, etc.) that allows for more efficient vehicle routing and usage of the autonomous vehicle resources (e.g., fuel, battery power, storage, etc.).

With reference now to the FIGS., example embodiments of the present disclosure will be discussed in further detail. Example embodiments of the present disclosure describe operations and functions performed by certain systems (e.g., an operations computing system, a vehicle provider computing system, a vehicle computing system, etc.) for illustrative purposes. One or more of the operations and functions described as being performed by one system can be performed by another. For example, the operations and functions of a vehicle computing system can be performed by another computing system (e.g., a vehicle provider computing system, an operations computing system, etc.), and vice versa, and/or a combination thereof.

FIG. 1 illustrates an example vehicle computing system 100 according to example embodiments of the present disclosure. The vehicle computing system 100 can be associated with an autonomous vehicle 105. The vehicle computing system 100 can be located onboard (e.g., included on and/or within) the autonomous vehicle 105.

The autonomous vehicle 105 incorporating the vehicle computing system 100 can be various types of vehicles. For instance, the autonomous vehicle 105 can be a ground-based autonomous vehicle such as an autonomous car, autonomous truck, autonomous bus, etc. The autonomous vehicle 105 can be an air-based autonomous vehicle (e.g., airplane, helicopter, or other aircraft) or other types of vehicles (e.g., watercraft, etc.). The autonomous vehicle 105 can drive, navigate, operate, etc. with minimal and/or no interaction from a human operator (e.g., driver). In some implementations, a human operator can be omitted from the autonomous vehicle 105 (and/or also omitted from remote control of the autonomous vehicle 105). In some implementations, a human operator can be included in the autonomous vehicle 105.

In some implementations, the autonomous vehicle 105 can be configured to operate in a plurality of operating modes. The autonomous vehicle 105 can be configured to operate in a fully autonomous (e.g., self-driving) operating mode in which the autonomous vehicle 105 is controllable without user input (e.g., can drive and navigate with no input from a human operator present in the autonomous vehicle 105 and/or remote from the autonomous vehicle 105). The autonomous vehicle 105 can operate in a semi-autonomous operating mode in which the autonomous vehicle 105 can operate with some input from a human operator present in the autonomous vehicle 105 (and/or a human operator that is remote from the autonomous vehicle 105). The autonomous vehicle 105 can enter into a manual operating mode in which the autonomous vehicle 105 is fully controllable by a human operator (e.g., human driver, pilot, etc.) and can be prohibited and/or disabled (e.g., temporary, permanently, etc.) from performing autonomous navigation (e.g., autonomous driving). In some implementations, the autonomous vehicle 105 can implement vehicle operating assistance technology (e.g., collision mitigation system, power assist steering, etc.) while in the manual operating mode to help assist the human operator of the autonomous vehicle 105.

The operating modes of the autonomous vehicle 105 can be stored in a memory onboard the autonomous vehicle 105. For example, the operating modes can be defined by an operating mode data structure (e.g., rule, list, table, etc.) that indicates one or more operating parameters for the autonomous vehicle 105, while in the particular operating mode. For example, an operating mode data structure can indicate that the autonomous vehicle 105 is to autonomously plan its motion when in the fully autonomous operating mode. The vehicle computing system 100 can access the memory when implementing an operating mode.

The operating mode of the autonomous vehicle 105 can be adjusted in a variety of manners. For example, the operating mode of the autonomous vehicle 105 can be selected remotely, off-board the autonomous vehicle 105. For example, a remote computing system (e.g., of a vehicle provider and/or service entity associated with the autonomous vehicle 105) can communicate data to the autonomous vehicle 105 instructing the autonomous vehicle 105 to enter into, exit from, maintain, etc. an operating mode. By way of example, such data can instruct the autonomous vehicle 105 to enter into the fully autonomous operating mode. In some implementations, the operating mode of the autonomous vehicle 105 can be set onboard and/or near the autonomous vehicle 105. For example, the vehicle computing system 100 can automatically determine when and where the autonomous vehicle 105 is to enter, change, maintain, etc. a particular operating mode (e.g., without user input). Additionally, or alternatively, the operating mode of the autonomous vehicle 105 can be manually selected via one or more interfaces located onboard the autonomous vehicle 105 (e.g., key switch, button, etc.) and/or associated with a computing device proximate to the autonomous vehicle 105 (e.g., a tablet operated by authorized personnel located near the autonomous vehicle 105). In some implementations, the operating mode of the autonomous vehicle 105 can be adjusted by manipulating a series of interfaces in a particular order to cause the autonomous vehicle 105 to enter into a particular operating mode.

The vehicle computing system 100 can include one or more computing devices located onboard the autonomous vehicle 105. For example, the computing device(s) can be located on and/or within the autonomous vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the autonomous vehicle 105 (e.g., its computing system, one or more processors, etc.) to perform operations and functions, such as those described herein for controlling an autonomous vehicle, determining whether the vehicle can concurrently perform vehicle services, etc.

The autonomous vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the autonomous vehicle 105 over one or more networks (e.g., via one or more wireless signal connections). In some implementations, the communications system 120 can allow communication among one or more of the system(s) on-board the autonomous vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the autonomous vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the autonomous vehicle 105. For instance, the sensor(s) 125 can acquire image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. In some implementations, the autonomous vehicle 105 can include inertial measurement unit(s), wheel odometry devices, etc.

The autonomous vehicle 105 can also include other sensors configured to acquire data associated with the autonomous vehicle 105. The sensor(s) 125 can include one or more sensors that are located within the interior of the autonomous vehicle 105 and/or configured to acquire sensor data 140 associated with the interior of the autonomous vehicle 105. For example, the sensor(s) 125 can include cameras or other image capture devices, RADAR sensors, weight sensors, motion sensors, heat sensors, humidity sensors, and/or other types of sensors that are configured to acquire sensor data 140 associated with the interior of the autonomous vehicle 105. By way of example, the autonomous vehicle 105 can include one or more interior vehicle cameras configured to acquire image data (e.g., camera image data, etc.) indicative of the interior cabin of the autonomous vehicle 105 and/or one or more of its compartments (e.g., a trunk, etc.). Additionally, or alternatively, the autonomous vehicle 105 can include weight sensors configured to acquire data indicative of the weight of an item, a user, and/or other cargo (or lack thereof) within the autonomous vehicle 105. As further described herein, the vehicle computing system 100 can utilize such sensor data to determine the available capacity and/or cargo space available within the autonomous vehicle 105.

In some implementations, the sensor data 140 can be indicative of one or more objects within the surrounding environment of the autonomous vehicle 105. The object(s) can include, for example, vehicles, pedestrians, bicycles, and/or other objects. The object(s) can be located in front of, to the rear of, to the side of the autonomous vehicle 105, etc. The sensor data 140 can be indicative of locations associated with the object(s) within the surrounding environment of the autonomous vehicle 105 at one or more times. The vehicle sensor(s) 125 can provide the sensor data 140 to the autonomy computing system 130.

In addition to the sensor data 140, the autonomy computing system 130 can retrieve or otherwise obtain map data 145. The map data 145 can provide information about the surrounding environment of the autonomous vehicle 105. In some implementations, an autonomous vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the autonomous vehicle 105 in comprehending and perceiving its surrounding environment and its relationship thereto. In some implementations, the vehicle computing system 100 can determine a vehicle route for the autonomous vehicle 105 based at least in part on the map data 145.

The autonomous vehicle 105 can include a positioning system 150. The positioning system 150 can determine a current position of the autonomous vehicle 105. The positioning system 150 can be any device or circuitry for analyzing the position of the autonomous vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the autonomous vehicle 105 can be used by various systems of the vehicle computing system 100 and/or provided to a remote computing system. For example, the map data 145 can provide the autonomous vehicle 105 relative positions of the elements of a surrounding environment of the autonomous vehicle 105. The autonomous vehicle 105 can identify its position within the surrounding environment (e.g., across six axes, etc.) based at least in part on the map data. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the autonomous vehicle 105 and determine a motion plan for controlling the motion of the autonomous vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the autonomous vehicle 105 according to the motion plan.

The vehicle computing system 100 (e.g., the autonomy computing system 130) can identify one or more objects that are proximate to the autonomous vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the autonomous vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160 (and/or the motion planning system 165).

The prediction system 160 can be configured to predict a motion of the object(s) within the surrounding environment of the autonomous vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the autonomous vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the autonomous vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the autonomous vehicle 105 can perform a certain action (e.g., pass an object, etc.) without increasing the potential risk to the autonomous vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the autonomous vehicle 105 (e.g., due to an overriding factor). In some implementations, the motion plan 180 may define the vehicle's motion such that the autonomous vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the autonomous vehicle 105 (e.g., multiple times per second). Each new motion plan can describe a motion of the autonomous vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the autonomous vehicle 105.

The vehicle computing system 100 can cause the autonomous vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the autonomous vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the autonomous vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the autonomous vehicle 105 to autonomously travel within the vehicle's surrounding environment.

Figure 2:
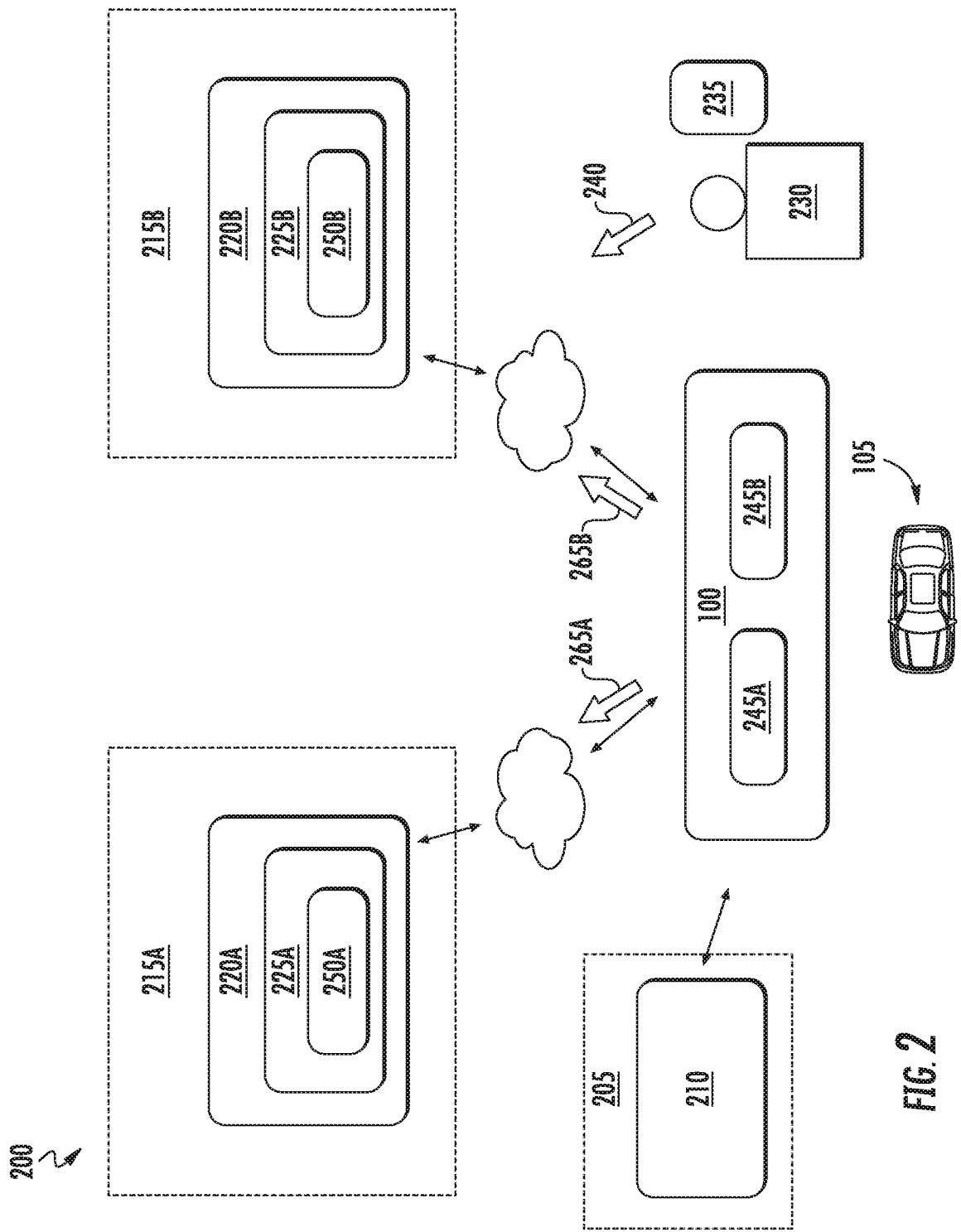
FIG. 2 depicts example architecture for communicating with a plurality of service entities according to example embodiments of the present disclosure.

The vehicle computing system 100 of the autonomous vehicle 105 can be configured to communicate with a plurality of different computing systems that are remote from the autonomous vehicle 105 via the architecture 200. The autonomous vehicle 105 can communicate with a variety of different parties. For example, FIG. 2 depicts an example architecture 200 that allows for such communication according to example embodiments of the present disclosure.

In some implementations, the autonomous vehicle 105 can be associated with a vehicle provider 205. The vehicle provider 205 can include, for example, an owner, a manufacturer, a vendor, a manager, a coordinator, a handler, etc. of the autonomous vehicle 105. The vehicle provider 205 can be an individual, a group of individuals, an entity (e.g., a company, other organization, etc.), a group of entities, a service entity, etc. In some implementations, the autonomous vehicle 105 can be included in a fleet of vehicles associated with the vehicle provider 205. The vehicle provider 205 can utilize a vehicle provider computing system 210 that is remote from the autonomous vehicle 105 to communicate (e.g., over one or more wireless communication channels) with the vehicle computing system 100 of the autonomous vehicle 105. The vehicle provider computing system 210 can include a server system (e.g., of an entity, etc.), a user device (e.g., of an individual owner, etc.), and/or other types of computing systems.

The autonomous vehicle 105 can be configured to perform vehicle services for a plurality of different service entities 215A-B. An autonomous vehicle 105 can perform a vehicle service by, for example and as further described herein, travelling (e.g., traveling autonomously) to a location associated with a requested vehicle service, allowing user(s) and/or item(s) to board or otherwise enter the autonomous vehicle 105, transporting the user(s) and/or item(s), allowing the user(s) and/or item(s) to deboard or otherwise exit the autonomous vehicle 105, etc. In this way, the autonomous vehicle 105 can provide the vehicle service(s) for a service entity to a user.

A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of one or more vehicle services to one or more users. For example, a service entity can offer vehicle service(s) to users via one or more software applications (e.g., that are downloaded onto a user computing device), via a website, and/or via other types of interfaces that allow a user to request a vehicle service. As described herein, the vehicle services can include transportation services (e.g., by which a vehicle transports user(s) from one location to another), delivery services (e.g., by which a vehicle transports/delivers item(s) to a requested destination location), courier services (e.g., by which a vehicle retrieves item(s) from a requested origin location and transports/delivers the item to a requested destination location), and/or other types of services.

Each service entity 215A-B can be associated with a respective telecommunications network system 220A-B of that service entity. A telecommunications network system can include the infrastructure to facilitate communication between the autonomous vehicle 105 and the various computing systems of the associated service entity that are remote from the autonomous vehicle 105. For example, a service entity 215A-B can utilize an operations computing system 225A-B of the service entity to communicate with, coordinate, manage, etc. autonomous vehicle(s) to perform the vehicle services of the service entity 215A-B. The telecommunications network system 220A-B can allow an autonomous vehicle 105 to utilize the back-end functionality of the operations computing system 225A-B (e.g., vehicle service assignment allocation, vehicle technical support, etc.).

An operations computing system 225A-B can include one or more computing devices that are remote from the autonomous vehicle 105 (e.g., located off-board the autonomous vehicle 105). For example, such computing device(s) can be components of a cloud-based server system and/or other type of computing system that can communicate with the vehicle computing system 100 of the autonomous vehicle 105, another computing system (e.g., a vehicle provider computing system 210, etc.), a user device, etc. The operations computing system 225A-B can be distributed across one or more location(s) and include one or more subsystems. The computing device(s) of an operations computing system 225A-B can include various components for performing various operations and functions. For instance, the computing device(s) can include one or more processor(s) and one or more tangible, non-transitory, computer readable media (e.g., memory devices, etc.). The one or more tangible, non-transitory, computer readable media can store instructions that when executed by the one or more processor(s) cause the operations computing system 225A-B (e.g., the one or more processors, etc.) to perform operations and functions, such as communicating data to and/or obtaining data from vehicle(s), obtaining data associated with geographic area(s), identifying vehicle imbalances, re-positioning vehicles, coordinating the provision of vehicle services by vehicle(s), etc. as further described herein.

An operations computing system 225A-B can communicate with an autonomous vehicle 105 via the service entity's computing platform. A computing platform of a service entity 215A-B can provide the vehicle computing system 100 and the operations computing system 225A-B with a computing environment that allows the systems to communicate. A computing platform can include a variety of computer architectures. Moreover, the computing platform can include the software, hardware, application programming interface(s), etc. that are associated with the service entity 215A-B. Each service entity 215A-B may have a different computing platform that can allow the service entity's operations computing system 225A-B and the vehicle computing system 100 to communicate via the telecommunications network system 220A-B associated with the service entity. In some implementations, one or more service entities may utilize the same computing platform.

One or more of the components of a computing platform can be accessible by the vehicle computing system 100. For instance, to help communicate with the various different service entities 215A-B, a vehicle computing system 100 of the autonomous vehicle 105 can include a plurality of vehicle clients 245A-B, each associated with a different service entity 215A-B. For example, the autonomous vehicle 105 can include a first vehicle client 245A associated with a first service entity 215A and a second vehicle client 245B associated with a second service entity 215B (e.g., that is different than the first service entity 215A). A vehicle client can be a software platform component that is stored onboard an autonomous vehicle 105. For example, a vehicle client can include firmware, software (e.g., a software application), etc. that is stored onboard the vehicle 105 (and/or in an offboard memory that is accessible by the autonomous vehicle 105) and that can allow the vehicle computing system 100 to communicate data to and/or obtain data from the operations computing system 225A-B associated with a service entity 215A-B. For example, a vehicle client 245A-B can allow the vehicle computing system 100 to receive data indicative of one or more vehicle service assignments from an associated service entity 215A-B. The vehicle client 245A-B can be provided to an autonomous vehicle 105 by an operations computing system 225A-B associated with a service entity 215A-B, provided to another computing system (e.g., a vehicle provider computing system 210, etc.) that can then help implement the vehicle client 245A-B on the autonomous vehicle 105 (e.g., by communicating a configuration to the vehicle computing system 100), and/or other approaches. In some implementations, the operations computing system 225A-B and the vehicle computing system 100 can indirectly communicate. For example, the vehicle provider computing system 210 can serve as an intermediary between the operations computing system 225A-B and the vehicle computing system 100 such that at least some data is communicated from the operations computing system 225A-B (or the vehicle computing system 100) to the vehicle provider computing system 210 and then to the vehicle computing system 100 (or the operations computing system 225A-B).

A vehicle client 245A-B can be implemented via hardware and/or software onboard the autonomous vehicle 105. The vehicle computing system 100 can utilize the vehicle client 245A-B to access an application programming interface 250A-B associated with a service entity 215A-B. For example, the vehicle computing system 100 can invoke, via a vehicle client 245A-B, the application programming interface 250A-B to access a library indicative of a plurality of parameters. The library can include, for example, a central repository for parameters that can be used to generate a communication (e.g., query string, message, data set, etc.) to be sent to the service entity's operations computing system 225A-B. In some implementations, each service entity 215A-B can be associated with a different application programming interface 250A-B. For example, a first service entity 215A can be associated with a first application programming interface 250A and a second service entity 215B can be associated with a second application programming interface 250B (e.g., which is different from the first application programming interface 250A). Additionally, or alternatively, one or more service entities can utilize the same application programming interface and/or the first and second application programming interfaces 250A-B can be the same (or at least similar).

A user 230 can request a vehicle service from a service entity 215A-B. For example, the user 230 can provide user input to a user device 235 to request a vehicle service (e.g., via a user interface associated with a mobile software application of the service entity, etc.). The user device 235 can communicate (e.g., directly and/or indirectly via another computing system) data 240 indicative of a request for a vehicle service to an operations computing system 225A-B associated with the service entity 215A-B (and/or an associated system). The request can indicate the type of vehicle service that the user 230 desires (e.g., a transportation service, a delivery service, a courier service, etc.), one or more locations (e.g., an origin location, a destination location, etc.), timing constraints (e.g., pick-up time, drop-off time, deadlines, etc.), a number of user(s) and/or items to be transported in the vehicle, one or more other service parameters (e.g., a need for handicap access, a need for trunk space, etc.), and/or other information. The operations computing system 225A-B of the service entity 215A-B can process the data 240 indicative of the request and generate a vehicle service assignment that is associated with the service request.

The operations computing system 225A-B of the service entity 215A-B can process the request and identify one or more autonomous vehicles that may be able to perform the requested vehicle services for the user 230. For instance, the operations computing system 225A-B can identify which vehicle(s) are online with the service entity.

An autonomous vehicle can be online with a service entity so that the autonomous vehicle is available to obtain data indicative of a vehicle service assignment associated with the service entity, so that the autonomous vehicle is available to address a vehicle service assignment, so that the autonomous vehicle is available to perform a vehicle service for the service entity, etc. For example, an autonomous vehicle 105 can go online with a service entity. An autonomous vehicle that is online with a service entity can be, for example, a vehicle that has performed one or more of: launching a vehicle client associated with the service entity, accessing an API associated with the service entity, establishing a communication systems with a computing system of the service entity, connecting to a computing platform and/or a telecommunications network of the service entity, and/or taken other actions to go online with the service entity. The online vehicle can be able to communicate with the serve entity's computing system, for example, to obtain data (e.g., data indicative of vehicle service assignments).

For instance, the vehicle computing system 100 can go online with the computing platform and/or a first telecommunications network 220A of a first service entity 215A such that the autonomous vehicle 105 is able to communicate with the first operations computing system 225A of the first service entity 215A. This can allow the vehicle computing system 100 to obtain data indicative of one or more vehicle service assignments associated with the first service entity 215A. By way of example, as described herein, the vehicle computing system 100 can include a first vehicle client 245A associated with the first service entity 215A. The vehicle computing system 100 can indicate the vehicle's availability to perform vehicle services and/or obtain vehicle service assignments from the first service entity. This can include launching the first vehicle client 245A. The vehicle computing system 100 can establish a first communication session with a first remote computing system associated with the first service entity 215A (e.g., the first operations computing system 225A). The communication session can be opened based at least in part on a first application programming interface 250A associated with the first service entity 215A. For instance, the vehicle computing system 100 can access, via the first vehicle client 245A, the first application programming interface 250A associated with the first service entity 215A. The vehicle computing system 100 can generate a first communication 265A (e.g., data string, etc.) based at least in part on the first application programming interface 250A (e.g., based on the defined parameters thereof, etc.). The first communication 265A can indicate that the autonomous vehicle 105 is online with the first service entity 215A. The first communication 265A can indicate that the autonomous vehicle 105 is available to perform at least one first vehicle service for the first service entity 215A and/or is available to obtain vehicle service assignment(s) associated with the first service entity 215A (e.g., a computing system associated therewith). The vehicle computing system 100 can provide the first communication 265A to the first operations computing system 225A of the first service entity 215A to indicate that the autonomous vehicle 105 is online with the first service entity 215A and that the autonomous vehicle 105 is available to perform vehicle service(s) for the first service entity 215A. Additionally, or alternatively, the vehicle computing system 100 can provide the first communication 265A to the vehicle provider computing system 210, which can provide the first communication 265A (or similar such data) to the first operations computing system 225A to indicate that the autonomous vehicle 105 is online with the service entity and that the autonomous vehicle 105 is available to perform vehicle service(s) for the first service entity 215A. In some implementations, the vehicle provider computing system 210 can perform similar operations to communicate with the operations computing system of a service entity via an application programming interface.

A similar such approach can be utilized by the vehicle computing system 100 to go online with a second service entity 215B. For example, the vehicle computing system 100 can access, via the second vehicle client 245B, the second application programming interface 250B associated with the second service entity 215B. The vehicle computing system 100 can generate a second communication 265B based at least in part on the second application programming interface 250B. The second communication 265B can indicate that the autonomous vehicle 105 is online with the second service entity 215B. The second communication 265B can indicate that the autonomous vehicle 105 is available to perform at least one vehicle service for the second service entity 215B and/or is available to obtain vehicle service assignment(s) associated with the second service entity 215B (e.g., a computing system associated therewith).

The operations computing system 225A-B can communicate a vehicle service assignment indicative of the requested vehicle service(s) to the autonomous vehicle 105. For instance, the first operations computing system 225A can communicate data indicative of a candidate vehicle service assignment associated with the first service entity 215A to the vehicle computing system 100 of the autonomous vehicle 105. The second operations computing system 225B can communicate data indicative of a different candidate vehicle service assignment associated with the second service entity 215B to the autonomous vehicle 105.

The vehicle computing system 100 can store one or more candidate vehicle service assignments in a vehicle service assignment queue. For example, FIG. 3 depicts an example vehicle service assignment queue 300 according to example embodiments of the present disclosure. The vehicle service assignment queue 300 can be a data structure (e.g., table, matrix, list, etc.) that is indicative of a plurality of candidate vehicle service assignments 305A-E. The vehicle service assignment queue 300 can be stored in one or more memories located onboard and/or offboard the autonomous vehicle 105. In some implementations, at least a portion of the data associated with the plurality of candidate vehicle service assignments 305A-E can be stored in a vehicle service assignment queue 300 in a memory onboard the autonomous vehicle 105. Additionally, or alternatively, at least a portion of the data indicative of the plurality of candidate vehicle service assignments 305A-E can be stored in a vehicle service assignment queue 300 in a memory that is offboard the autonomous vehicle 105 (e.g., in a memory associated with the vehicle provider computing system 210).

Each candidate vehicle service assignment 305A-E can be indicative of information associated with the requested vehicle service. Such information can include, for example, data indicative of the type of vehicle service requested (e.g., transportation service, delivery service, courier service, etc.), data indicative of the capacity required for the requested vehicle service (e.g., a number of users/items that are to occupy the vehicle, amount of cargo space needed for an item, a size/shape/type of an item, etc.), data indicative of one or more locations (e.g., origin location, destination location, intermediate location, etc.), data indicative of one or more time constraints (e.g., pick-up times, drop-off times, time limits for delivery, service duration, etc.), data indicative of one or more special service parameters (e.g., handle-with-care instructions, handicap access requests, etc.), data indicative of user preferences (e.g., whether the user is willing to participate in a service pool, etc.), data indicative of a compensation parameter (e.g., the compensation for delivering an item, transporting a user, etc.), data indicative of one or more vehicle service incentives (e.g., increased vehicle rating, etc.), data indicative of an order in which the vehicle service assignment was obtained by the vehicle computing system 100 (and/or by a vehicle provider computing system 210 that obtains such data for the autonomous vehicle 105), and/or other types of data. An autonomous vehicle 105 can be configured to receive a plurality of different vehicle service assignments 305A-E from a plurality of different service entities 310A-E. Each of the vehicle service entities 310A-E can be configured as similarly described with reference to service entities 215A-B of FIG. 2.

The vehicle computing system 100 of an autonomous vehicle 105 can be configured to pool different vehicle service assignments such that the autonomous vehicle 105 can perform vehicle services for different service entities, at the same time. For instance, the vehicle computing system 100 can obtain data indicative of a first vehicle service assignment 315A. In some implementations, the vehicle computing system 100 can access the vehicle service assignment queue 300 to identify a first vehicle service assignment 315A for the autonomous vehicle 105. In some implementations, the first vehicle service assignment 315A can be the first candidate vehicle service assignment 305A in the vehicle service assignment queue 300 (e.g., the first candidate vehicle service assignment received for the autonomous vehicle 105). In some implementations, the first vehicle service assignment 315A may not be the first candidate vehicle service assignment 305A in the vehicle service assignment queue 300. For example, the first vehicle service assignment 315A may be a subsequent candidate vehicle service assignment 305B-E. The subsequent candidate vehicle service assignment may, for example, include parameters that are preferred by the autonomous vehicle 105 (e.g., within a preferred location, preferred service type, preferred level of compensation, etc.).

In some implementations, the first vehicle service assignment 315A may not be included in the vehicle service assignment queue 300 associated with the autonomous vehicle 105. For instance, the vehicle service assignment queue 300 may be empty or the autonomous vehicle 105 may not yet be activated for service. The vehicle computing system 100 can go online with a plurality of different service entities (e.g., sign online to various service platforms/networks, establish different communication sessions with different operations computing systems, etc.) and/or indicate that the autonomous vehicle 105 is available to perform a vehicle service. The vehicle computing system 100 can obtain data indicative of a first vehicle service assignment 315A from a remote computing system such as, for example, the operations computing system of a service entity and/or an associated vehicle provider computing system.

The first vehicle service assignment 315A can be associated with a first service entity and can be indicative of a first vehicle service. For instance, the first vehicle service assignment 315A can be associated with a first service entity that generated the first vehicle service assignment 315A and/or received the request for the first vehicle service (e.g., made through a mobile app, etc.). The first vehicle service can be, for example, a delivery service to transport a package from a pick-up location to a destination location.

The vehicle computing system 100 can accept the first vehicle service assignment 315A for the autonomous vehicle. For instance, the vehicle computing system 100 can communicate data indicative of an acceptance to the operations computing system of the first service entity. Such acceptance can be communicated directly or indirectly (e.g., via a vehicle provider computing system, etc.)

The vehicle computing system 100 can determine whether or not the autonomous vehicle 105 is available to perform one or more second vehicle services concurrently with the first vehicle service. For instance, the vehicle computing system 100 can determine whether the autonomous vehicle 105 is available or is unavailable to perform the second vehicle service concurrently with the first vehicle service prior to accepting the first vehicle service assignment 315A for the autonomous vehicle 105. In some implementations, the vehicle computing system 100 can determine whether the autonomous vehicle 105 is available or is unavailable to perform the second vehicle service concurrently with the first vehicle service after the autonomous vehicle 105 accepts the first vehicle service assignment 315A. In some implementations, the vehicle computing system 100 can determine whether the autonomous vehicle 105 is available or is unavailable to perform the second vehicle service concurrently with the first vehicle service prior to the autonomous vehicle 105 beginning to perform the first vehicle service (e.g., transport the item for delivery, etc.). In some implementations, the vehicle computing system 100 can determine whether the autonomous vehicle 105 is available or is unavailable to perform the second vehicle service concurrently with the first vehicle service after the autonomous vehicle 105 begins to perform the first vehicle service. As used herein, the concurrent performance of vehicle services refers to an autonomous vehicle performing one vehicle service for at least a portion of the time that the autonomous vehicle is performing another vehicle service. By way of example, the autonomous vehicle 105 can transport a user/item for one vehicle service assignment (e.g., a first vehicle service assignment) during at least a portion of the time that the autonomous vehicle 105 is transporting a user/item for another vehicle service assignment (e.g., a second vehicle service assignment).

The vehicle computing system 100 can determine whether the autonomous vehicle 105 is available or is unavailable to perform one or more second vehicle services concurrently with the first vehicle service based at least in part on the first vehicle service assignment. For instance, the first vehicle service assignment 315A can be indicative of the vehicle capacity required for the first vehicle service. For instance, the first vehicle service assignment 315A can be indicative of the number of seats that are required for the performance of the first vehicle service and/or an amount of cargo space that is required for the first vehicle service. This can include, for example, the size, shape, type, etc. of the package to be delivered for a delivery service. The first vehicle service assignment 315A can also indicate the requested pick-up and drop-off locations for the package, a delivery deadline, as well as whether an associated user (e.g., a recipient of the package) is willing to allow the vehicle to concurrently perform another vehicle service while transporting the package. The vehicle computing system 100 can analyze this data to determine whether the autonomous vehicle 105 would be able to accept another vehicle service assignment. By way of example, even if the package would only require a limited amount of space within a compartment of the autonomous vehicle 105, the vehicle computing system 100 may determine that the autonomous vehicle 105 cannot accept another vehicle service assignment if the delivery deadline is prohibitively short and/or the associated user has indicated a preference against vehicle service pooling.

Additionally, or alternatively, the vehicle computing system 100 can obtain data associated with the autonomous vehicle 105 to help determine whether the autonomous vehicle 105 is available (or not) for another vehicle service assignment while performing the first vehicle service. For instance, the vehicle computing system 100 can obtain data indicative of a capacity of the autonomous vehicle 105. In some implementations, the vehicle computing system 100 can access data indicative of the vehicle's maximum capacity (e.g., from an onboard memory, remote computing system, etc.). The data indicative of the vehicle's maximum capacity can indicate the maximum allowable amount of storage space, the number of seats (with seat belts), the weight capacity, etc. of the autonomous vehicle 105. The autonomous vehicle 105 can obtain the data indicative of the capacity of the autonomous vehicle 105 before and/or after the autonomous vehicle 105 starts performing the first vehicle service (e.g., the delivery service, etc.), to determine how much capacity is left in the autonomous vehicle 105 for another potential vehicle service.

Additionally, or alternatively, the vehicle computing system 100 can determine whether the autonomous vehicle 105 is available for another vehicle service assignment based at least in part on sensor data 140. For instance, the data indicative of the capacity of the autonomous vehicle 105 can be obtained via one or more of the sensors 125 located onboard the autonomous vehicle 105. As described herein, the sensors 125 can include one or more interior cameras configured to acquire image data indicative of the interior of the autonomous vehicle 105 and/or one or more of its compartments and/or weight sensors configured to acquired data indicative of a force on the autonomous vehicle 105 (e.g., the weight of a passenger and/or item on a vehicle seat, floor, etc.). The vehicle computing system 100 can determine whether the autonomous vehicle 105 is available or is unavailable to perform the second vehicle service concurrently with the first vehicle service based at least in part on the data indicative of the capacity of the autonomous vehicle 105. For example, the vehicle computing system 100 can determined whether any more item(s) and/or user(s) (e.g., other than those associated with the first vehicle service) can fit within the autonomous vehicle 105 based at least in part on the capacity of the autonomous vehicle 105.

Figure 4A:
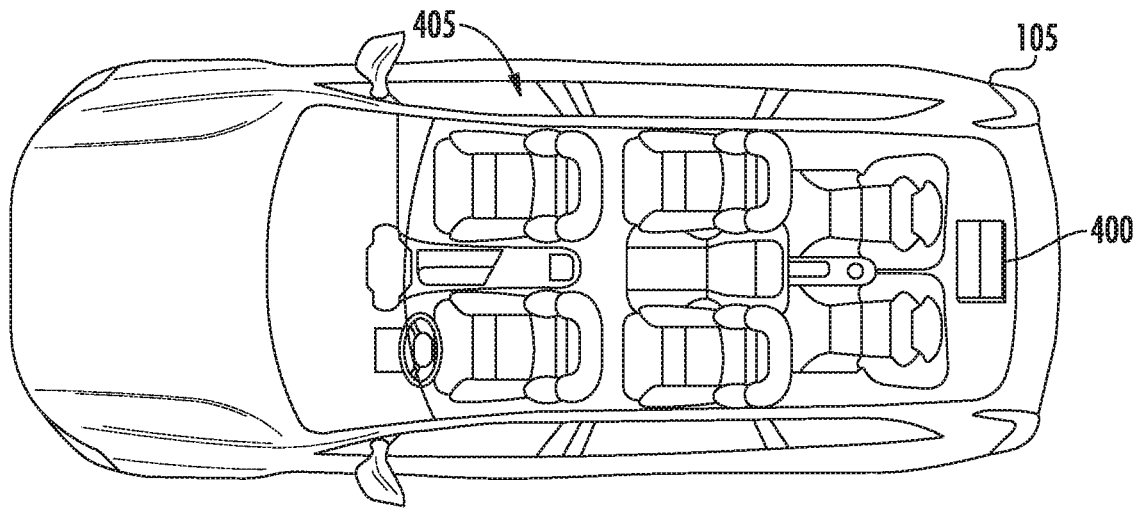
FIGS. 4A-B depict an example vehicle interior according to example embodiments of the present disclosure.

By way of example, with reference to FIG. 4A, a package 400 can be loaded into the interior 405A (e.g., a trunk, etc.) of the autonomous vehicle 105 for the first vehicle service assignment 315A. After the package 400A is loaded into the autonomous vehicle 105, the vehicle computing system 100 can obtain sensor data 140 from one or more of the sensors 125 onboard the autonomous vehicle 105. For example, the vehicle computing system 100 can obtain camera image data (e.g., from interior vehicle cameras) and/or weight sensor data (e.g., from onboard weight sensors). The vehicle computing system 100 can process such sensor data 140 to determine the amount of space within the vehicle's interior 405 that is occupied by the package 400 (e.g., by processing image data, weight sensor data, etc.), the amount of free space remaining within the vehicle's interior 405 that is not occupied by the package 400, the amount of weight capacity occupied by the package 400, and/or the remaining available weight capacity of the autonomous vehicle 105. This can allow the vehicle computing system 100 to determine whether additional item(s) and/or user(s) can fit within the autonomous vehicle 105.

Figure 4B:
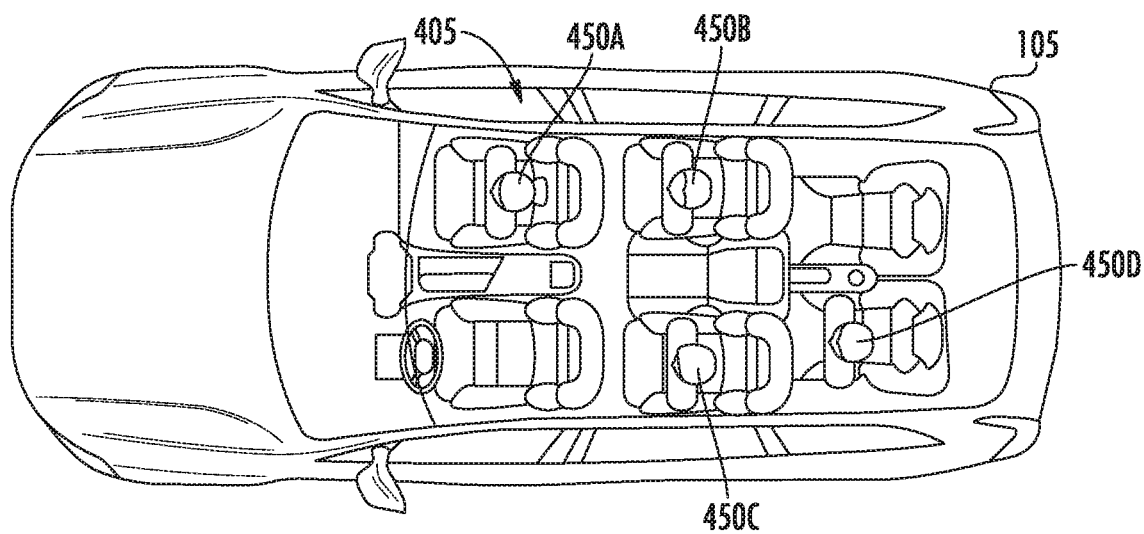

In another example, with reference to FIG. 4B, one or more users 450A-D can board the autonomous vehicle 105 for the first vehicle service assignment 315A (e.g., for a transportation service, etc.). After the user(s) 450A-D board the autonomous vehicle 105, the vehicle computing system 100 can obtain sensor data 140 from one or more of the sensors 125 onboard the autonomous vehicle 105. For example, the vehicle computing system 100 can obtain camera image data (e.g., from interior vehicle cameras) and/or weight sensor data (e.g., from onboard weight sensors) indicative of the number of user(s), the size of the user(s), the position of the user(s), the weight of the user(s), etc. The vehicle computing system 100 can process this sensor data 140 to determine the amount of space within the vehicle's interior 405A that is occupied by the user(s) 450A-D (e.g., by processing image data, weight sensor data, etc.), the amount of free space remaining within the vehicle's interior 405 that is not occupied by the user(s) 450A-D, the amount of weight capacity occupied by the user(s) 450A-D, and/or the remaining available weight capacity of the autonomous vehicle 105. In some implementations, the vehicle computing system 100 can obtain sensor data 140 before the package 400 is loaded into and/or the user(s)

450A-D board the autonomous vehicle 105, in order to determine the vehicle's capacity prior to the loading of the package 400 and/or boarding of the user(s) 450A-D.

Returning to FIG. 3, when it is determined that the autonomous vehicle 105 is unavailable to perform a second vehicle service concurrently with the first vehicle service, the vehicle computing system 100 can proceed with the first vehicle service assignment 315A. For instance, the vehicle computing system 100 can cause the autonomous vehicle 105 to perform the first vehicle service of the first vehicle service assignment 315A without concurrently performing the second vehicle service. By way of example, the vehicle computing system 100 (e.g., a vehicle controller component) can communicate one or more signals to the vehicle's control systems 135 to cause the autonomous vehicle 105 to initiate a motion control so that the autonomous vehicle 105 can travel to a pick-up location to retrieve a package for the delivery request. The autonomous vehicle 105 can deliver that package without providing any other vehicle services (e.g., without transporting any other user(s)/item(s)) while doing so.

When it is determined that the autonomous vehicle 105 is available to perform a second vehicle service concurrently with the first vehicle service, the vehicle computing system 100 can obtain data indicative of one or more second vehicle service assignments 315B. A second vehicle service assignment 315B can be associated with a second service entity that is different than the first service entity associated with the first vehicle service assignment 315A. The second vehicle service assignment 315B can be indicative of a second vehicle service. In some implementations, the first vehicle service can be the same type of vehicle service as the second vehicle service. For example, the first vehicle service and the second vehicle service can both be a delivery service, transportation service, etc. In some implementations, the first vehicle service can be a different type of vehicle service than the second vehicle service. For example, the first vehicle service can be a delivery service (e.g., retrieving item(s) for delivery, etc.), while the second vehicle service can be a transportation service (e.g., transporting user(s) from one geographic point to another, etc.).

The vehicle computing system 100 can evaluate the second vehicle service assignment(s) 315B to determine whether any of them fit the capacity of the autonomous vehicle 105 that would be available while the autonomous vehicle 105 also addresses a first vehicle service assignment 315A. For instance, the vehicle computing system 100 can access the vehicle service assignment queue 300 associated with the autonomous vehicle 105. As described herein, the vehicle service assignment queue 300 can include data indicative of a plurality of candidate vehicle service assignments 305A-E. At least one of the candidate vehicle service assignments 305A-E can be indicative of a second vehicle service, that is different that the first vehicle service.

By way of example, the first candidate vehicle service assignment 305A may have been selected by the vehicle computing system 100 as the first vehicle service assignment 315A to be addressed by the autonomous vehicle 105. As such, the other candidate vehicle service assignment 305B-E can be selected as a second vehicle service assignment 315B to be addressed by the autonomous vehicle 105 concurrently with the first vehicle service assignment 315A. The vehicle computing system 100 can obtain data indicative of the plurality of candidate vehicle service assignments 305B-E. The vehicle computing system 100 can analyze one or more of the candidate vehicle service assignments 305B-E to determine whether the autonomous vehicle 105 can accept any of the candidate vehicle service assignments 305B-E (e.g., based at least in part on the vehicle's available capacity). The vehicle computing system 100 can select a second vehicle service assignment 315B for the autonomous vehicle 105 based at least in part on one or more of the plurality of candidate vehicle service assignments 305B-E. The selected second vehicle service assignment 315B can be associated with a second service entity that is different from the first service entity associated with the first vehicle service assignment.

By way of example, the vehicle computing system 100 can determine that a package to be delivered in accordance with a first vehicle service assignment 315A (e.g., first candidate vehicle service assignment 305A) would occupy the vast majority of the trunk space of the autonomous vehicle 105. The vehicle computing system 100 can determine (e.g., based on known capacity information, sensor data, etc.) that the autonomous vehicle 105 still has five passenger seats available for a second vehicle service (e.g., to transport user(s), another item, etc.). The vehicle computing system 100 can review the available candidate vehicle service assignments 305B-E of the vehicle service assignment queue 300 to identify if any of the candidate service assignments 305B-E require five (or fewer) passenger seats. For example, the vehicle computing system 100 may identify the second candidate vehicle service assignment 305C that requests the transportation of one adult and one small bag (e.g., likely to fit on a passenger seat) as including a second vehicle service (e.g., a transportation service) that can be performed concurrently with the first vehicle service (e.g., the package delivery service). Accordingly, the vehicle computing system 100 can select the second candidate vehicle service assignment 305B as the second vehicle service assignment 315B to be addressed by the autonomous vehicle 105 concurrently with the first vehicle service assignment 315A. In some implementations, the vehicle computing system 100 can also evaluate the location(s) and/or other information associated with the candidate vehicle service assignments 305B-E in order to ensure that the performance of a second vehicle service would be efficient for the autonomous vehicle 105 (and convenient for the user(s) associated with the vehicle service assignment(s)).

Additionally, or alternatively, the vehicle computing system 100 can obtain data indicative of one or more second vehicle service assignments 315B from one or more remote computing systems. For instance, in the event that the vehicle service assignment queue 300 is empty or none of the candidate vehicle service assignments 305B-E in the vehicle service assignment queue 300 fit the available capacity of the autonomous vehicle 105, the vehicle computing system 100 can communicate the availability of the autonomous vehicle 105 to one or more service entities. The respective operations computing systems of those service entities can communicate data indicative of one or more candidate vehicle service assignments to the vehicle computing system 100 for consideration. In some implementations, the vehicle computing system 100 can communicate the availability of the autonomous vehicle 105 for a second vehicle service (e.g., to be performed concurrently with a first vehicle service) to a vehicle provider computing system. The vehicle provider computing system can obtain data indicative of one or more candidate vehicle service assignments for the autonomous vehicle 105 and communicate data to the vehicle computing system 100, accordingly.

In the event that the vehicle computing system 100 can identify a second vehicle service assignment 315B that fits the vehicle's available capacity, the vehicle computing system 100 can accept the second vehicle service assignment 315B. Accordingly, the vehicle computing system 100 can cause the autonomous vehicle 105 to concurrently perform the first vehicle service of the first vehicle service assignment 315A with the second vehicle service of the second vehicle service assignment 315B. This can include causing the autonomous vehicle 105 to initiate a motion control in accordance with the first vehicle service assignment 315A and the second vehicle service assignment 315B.

Figure 5A:
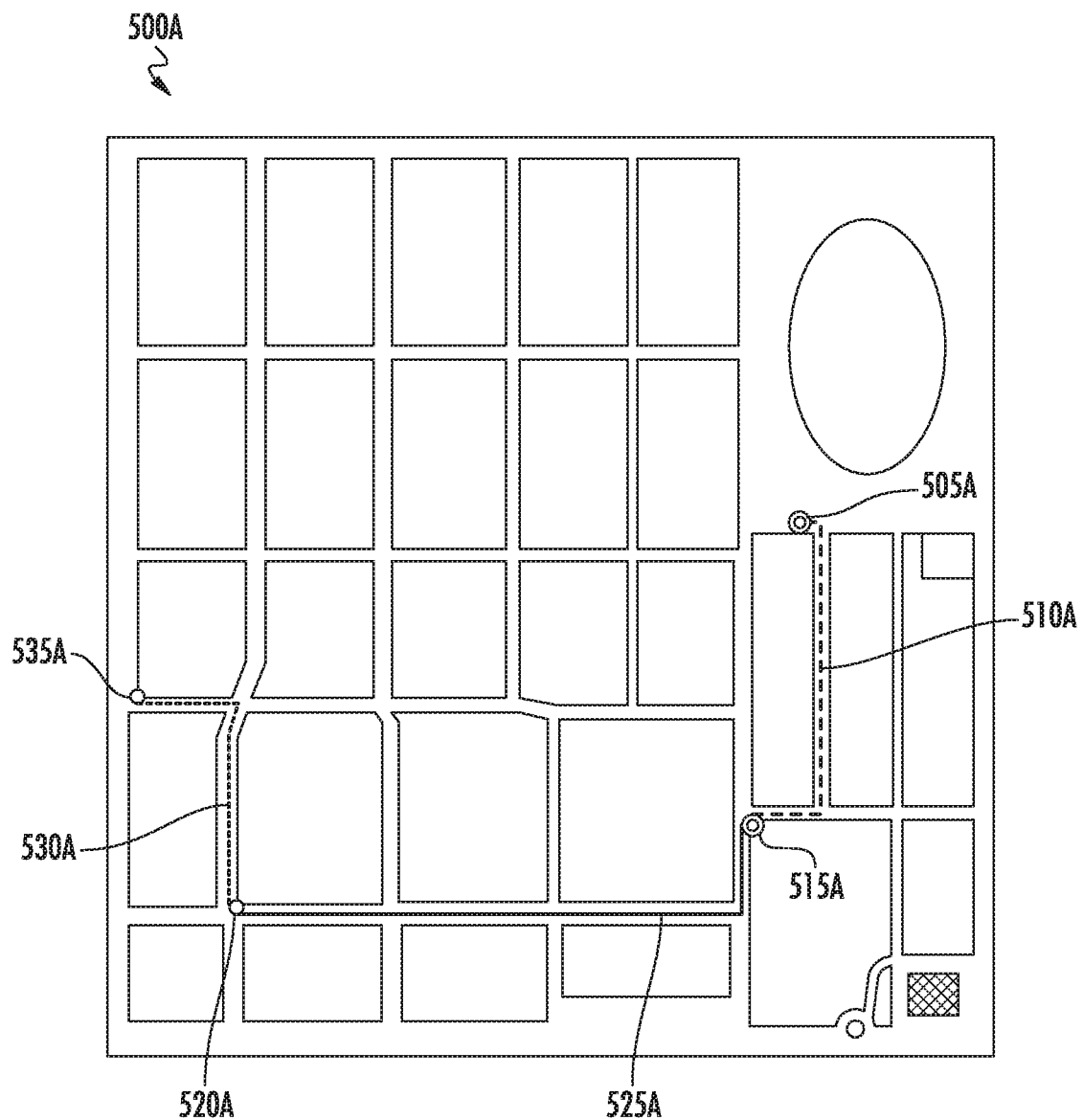
FIGS. 5A-C depict an example geographic area with example vehicle service trips according to example embodiments of the present disclosure.

By way of example, FIG. 5A depicts a geographic area 500A in which the autonomous vehicle 105 can perform vehicles services. The vehicle computing system 100 can cause the autonomous vehicle 105 to autonomously navigate to a first pick-up location 505A to retrieve a package to be delivered in accordance with the first vehicle service assignment 315A. After the package has been placed inside the autonomous vehicle 105, the vehicle computing system 100 can cause the autonomous vehicle 105 to perform the first vehicle service (e.g., transporting of the package for delivery) without any other vehicle services, as represented by the travel line 510A. The vehicle computing system 100 can determine that the autonomous vehicle 105 is available for a second vehicle service (e.g., a transportation service, etc.). The autonomous vehicle 105 can begin to transport an item in accordance with the first vehicle service (e.g., a delivery service) prior to one or more users boarding the autonomous vehicle 105 for the second vehicle service (e.g., the transportation service), as represented by travel line 510A. The vehicle computing system 100 can cause the autonomous vehicle 105 to travel to a second pick-up location 515A to allow one or more users to board the autonomous vehicle 105 to be transported in accordance with the second vehicle service assignment 315B. The route to pick-up the user(s) for the second vehicle service assignment 315B can be in the general direction of a first drop-off location 520A for the package so that the autonomous vehicle 105 can travel in an efficient manner. The vehicle computing system 100 can cause the autonomous vehicle 105 to travel to perform the first vehicle service (e.g., transporting the package for delivery, etc.) concurrently with the second vehicle service (e.g., transporting the users, etc.), as represented by the travel line 525A. For example, the vehicle computing system 100 can cause the autonomous vehicle 105 to initiate a motion control to transport the item during at least a portion of a time that the one or more users occupy the autonomous vehicle 105. The vehicle computing system 100 can cause the autonomous vehicle 105 to navigate to the first drop-off location 520A to deliver the package before dropping-off the user(s). The vehicle computing system 100 can cause the autonomous vehicle 105 to perform the second vehicle service without any other vehicle services, as represented by travel line 530A. For example, vehicle computing system 100 can cause the autonomous vehicle 105 to initiate a motion control to travel to a second drop-off location 535A associated with the second vehicle service (e.g., a drop-off location for the users).

In some implementations, the autonomous vehicle 105 can complete the performance of the second vehicle service prior to completing the performance of the first vehicle service. The vehicle computing system 100 can determine an order of completion of the vehicle service(s) based at least in part on whichever is more efficient with respect to the vehicle's resources (e.g., fuel, data storage, etc.), any stated timelines (e.g., delivery deadlines, etc.), incentives, compensation, and/or passenger preferences.

Figure 5B:
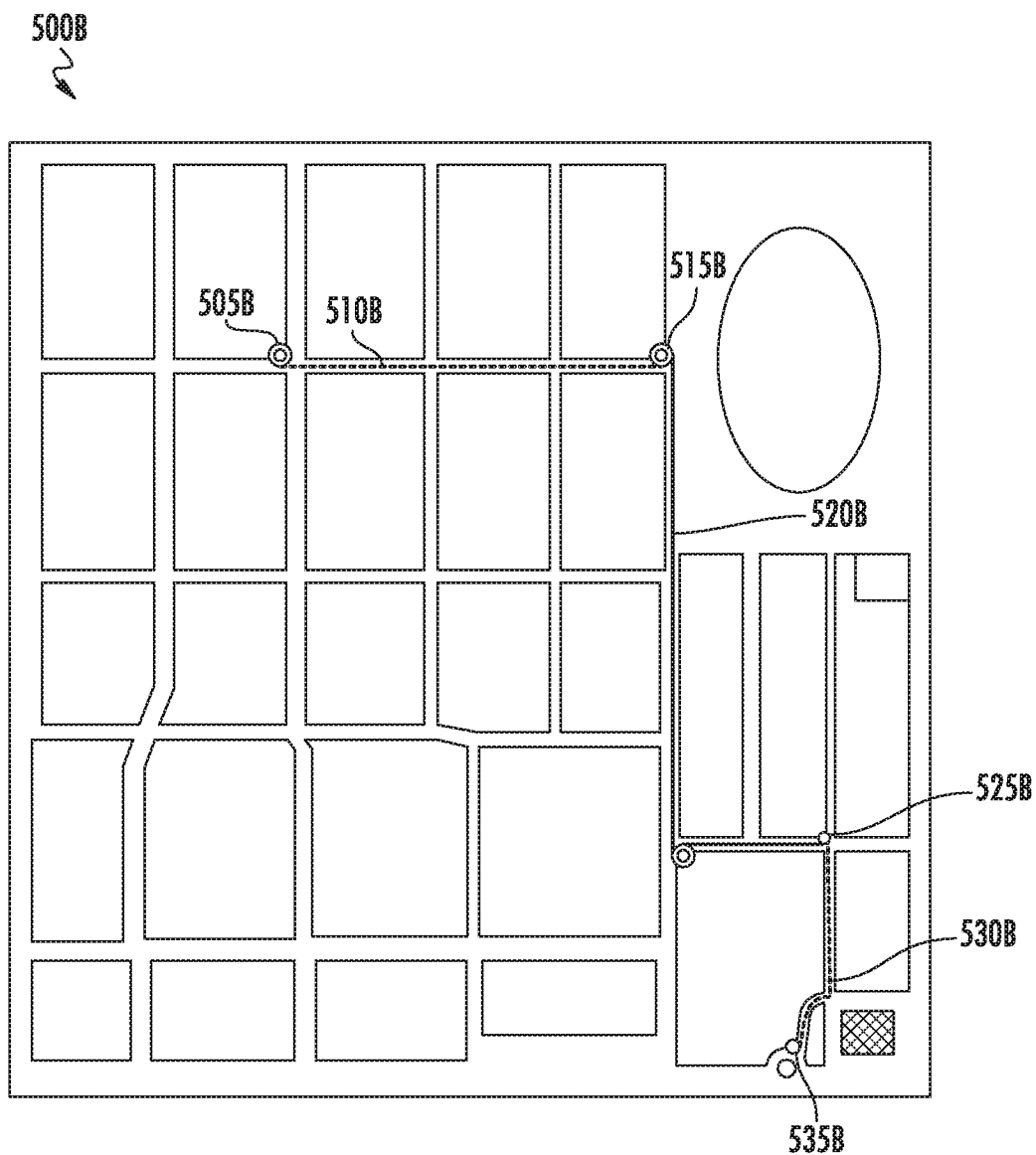

For example, FIG. 5B depicts a geographic area 500B in which the autonomous vehicle 105 can perform vehicles services. The vehicle computing system 100 can cause the autonomous vehicle 105 to autonomously navigate to a first pick-up location 505B to retrieve a package to be delivered in accordance with the first vehicle service assignment 315A. After the package has been placed inside the autonomous vehicle 105, the vehicle computing system 100 can cause the autonomous vehicle 105 to perform the first vehicle service (e.g., transporting of the package for delivery) without any other vehicle services, as represented by the travel line 510B. The vehicle computing system 100 can cause the autonomous vehicle 105 to travel to a second pick-up location 515B to allow one or more users to board the autonomous vehicle 105 to be transported in accordance with a second vehicle service assignment 315B. The vehicle computing system 100 can cause the autonomous vehicle 105 to perform the first vehicle service (e.g., transporting the package for delivery, etc.) concurrently with the second vehicle service (e.g., transporting the users, etc.), as represented by the travel line 520B. The vehicle computing system 100 can cause the autonomous vehicle 105 to navigate to a second drop-off location 525B to drop-off the user(s) in accordance with the second vehicle service, prior to delivery of the package for the first vehicle service. The vehicle computing system 100 can cause the autonomous vehicle 105 to again perform the first vehicle service without any other vehicle services, as represented by the travel line 530B. For example, vehicle computing system 100 can cause the autonomous vehicle 105 to initiate a motion control to travel to a first drop-off location 535B associated with the first vehicle service (e.g., a drop-off location for the package, etc.).

In some implementations, the vehicle computing system 100 can determine whether the autonomous vehicle 105 is available to perform another vehicle service (e.g., build another service pool) before dropping off the remaining item(s) or user(s). In this way, the vehicle computing system 100 can continuously attempt to build vehicle service pools for the autonomous vehicle 105.

Figure 5C:
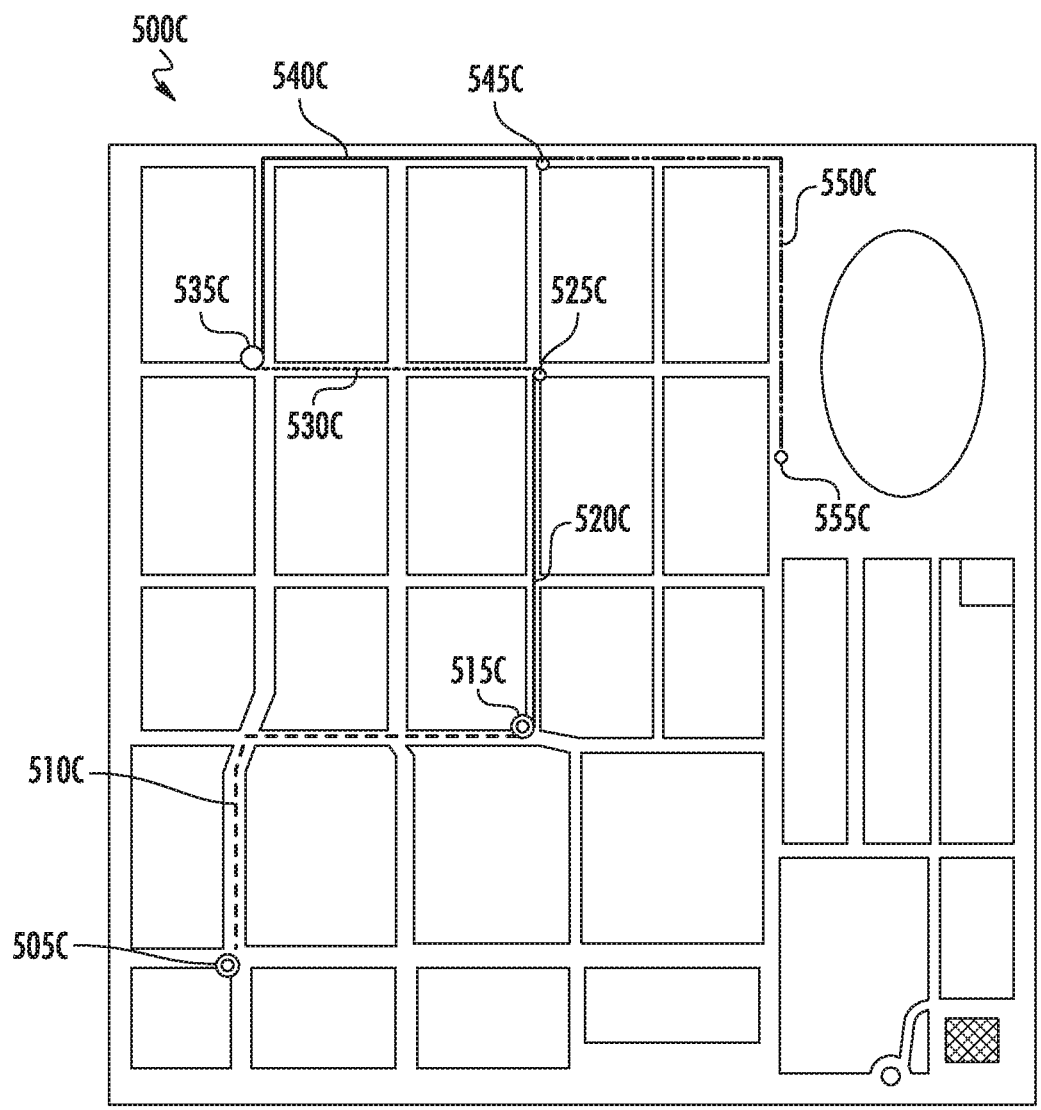

By way of example, FIG. 5C depicts a geographic area 500 in which the autonomous vehicle 105 can perform vehicles services. The vehicle computing system 100 can cause the autonomous vehicle 105 to autonomously navigate to a first pick-up location 505C to retrieve a package to be delivered in accordance with a first vehicle service assignment 315A. After retrieving the package, the vehicle computing system 100 can cause the autonomous vehicle 105 to perform the first vehicle service (e.g., transporting of the package for delivery) without any other vehicle services, as represented by the travel line 510C. The vehicle computing system 100 can cause the autonomous vehicle 105 to travel to a second pick-up location 515C to allow one or more users to board the autonomous vehicle 105 to be transported in accordance with the second vehicle service assignment 315C. The vehicle computing system 100 can cause the autonomous vehicle 105 to perform the first vehicle service (e.g., transporting the package for delivery, etc.) concurrently with the second vehicle service (e.g., transporting the users, etc.), as represented by the travel line 520C. The vehicle computing system 100 can cause the autonomous vehicle 105 to navigate to a first drop-off location 525C to deliver the package in accordance with the first vehicle service. The vehicle computing system 100 can cause the autonomous vehicle 105 to perform the second vehicle service without any other vehicle services, as represented by travel line 530C. Before and/or after completion of the first vehicle service, the vehicle computing system 100 can determine whether the autonomous vehicle 105 is available or unavailable to perform a third vehicle service. The vehicle computing system 100 can make such a determination in a similar manner to that utilized for determining whether the autonomous vehicle 105 is available or unavailable for the second vehicle service, as described herein. For example, the vehicle computing system 100 can determine that the autonomous vehicle 105 is available to pick-up an additional user associated with a third vehicle service assignment 315C (shown in FIG. 3) based at least in part on the available capacity of the autonomous vehicle 105 (e.g., the number of open seats in the vehicle when the user(s) associated with the second vehicle service assignment are onboard the vehicle). The vehicle computing system 100 can cause the autonomous vehicle 105 to travel to a third pick-up location 535C to allow one or more users to board the autonomous vehicle 105 to be transported in accordance with the third vehicle service assignment 315C. The vehicle computing system 100 can cause the autonomous vehicle 105 to perform the second vehicle service (e.g., transporting the user(s) associated with the second vehicle service assignment) concurrently with the third vehicle service (e.g., transporting the user(s) associated with the third vehicle service assignment), as represented by the travel line 540C. The vehicle computing system 100 can cause the autonomous vehicle 105 to navigate to a second drop-off location 545C to deliver the user(s) associated with the second vehicle service. The vehicle computing system 100 can cause the autonomous vehicle 105 to perform the third vehicle service without any other vehicle services, as represented by travel line 550C. For example, vehicle computing system 100 can cause the autonomous vehicle 105 to initiate a motion control to travel to a third drop-off location 555C associated with the third vehicle service (e.g., a drop-off location for the user(s) associated with the third vehicle service assignment).

When initiating motion control(s) to address the vehicle service assignments, the vehicle computing system 100 can plan the motion of the autonomous vehicle 105 such that it traverses an improved vehicle route. The improved vehicle route can be a route that allows the autonomous vehicle 105 to concurrently address two different vehicle service assignments (as described herein and shown in the FIGS.). For instance, the vehicle computing system 100 can initiate a motion control in accordance with the first vehicle service assignment and the second vehicle service assignment. This motion control can cause the autonomous vehicle 105 to traverse a route by which the autonomous vehicle 105 can travel to and arrive at the origin location(s) for the first, second, and/or third vehicle service assignments as well as the destination location(s) for the first, second, and/or third vehicle service assignments. While the respective origin and/or destination location(s) may differ from one another, the intermediate portion of the route for completing the vehicle service assignments (e.g., the waypoints associated therewith) can include at least some overlap. In this way, the motion of the autonomous vehicle 105 can be controlled in a manner (e.g., via the at least somewhat overlapping route, etc.) that allows for more efficient vehicle routing and usage of the resources of the autonomous vehicle 105 (e.g., fuel, battery power, storage, etc.).

In some implementations, the autonomous vehicle 105 can pool a vehicle service with a task that does not include the performance of another vehicle service. For instance, before and/or after acceptance of a first vehicle service assignment 315A, the vehicle computing system 100 can determine whether the autonomous vehicle 105 is available or unavailable to perform a task associated with the autonomous vehicle 105 based at least in part on the first vehicle service assignment. The task associated with the autonomous vehicle 105 can include, for example, receiving maintenance for the autonomous vehicle 105, acquiring sensor data (e.g., of an adjusted and/or new travel way, etc.), and/or other tasks that do not include the performance of an additional vehicle service. By way of example, the first vehicle service assignment can include the delivery of a non-perishable item by the end of the day. The vehicle computing system 100 can determine that the autonomous vehicle 105 will have sufficient time to receive maintenance (e.g., an oil change, tire rotation, etc.) while transporting the package. The vehicle computing system 100 can cause the autonomous vehicle 105 to initiate a motion control to travel to pick-up the item. Thereafter, the vehicle computing system 100 can cause the autonomous vehicle 105 to concurrently perform the vehicle service with the task. For example, the vehicle computing system can cause the autonomous vehicle 105 to initiate a motion control to travel to a service depot to receive maintenance while the package is onboard the autonomous vehicle 105. The vehicle computing system 100 can select a service depot based at least in part on the first vehicle service assignment. For example, the vehicle computing system 100 can select a service depot that is generally in the direction of a drop-off location for the item to be delivered. This can allow the autonomous vehicle 105 to efficient utilize its resources. The autonomous vehicle 105 can receive maintenance while the package is located within the autonomous vehicle 105. After completion of the maintenance, the autonomous vehicle 105 can travel to drop-off the package for the first vehicle service assignment 315A. In some implementations, the autonomous vehicle 105 can perform more than one tasks (e.g., receive maintenance, acquired sensor data of a new travel way, etc.) concurrently with the vehicle service.

Figure 6:
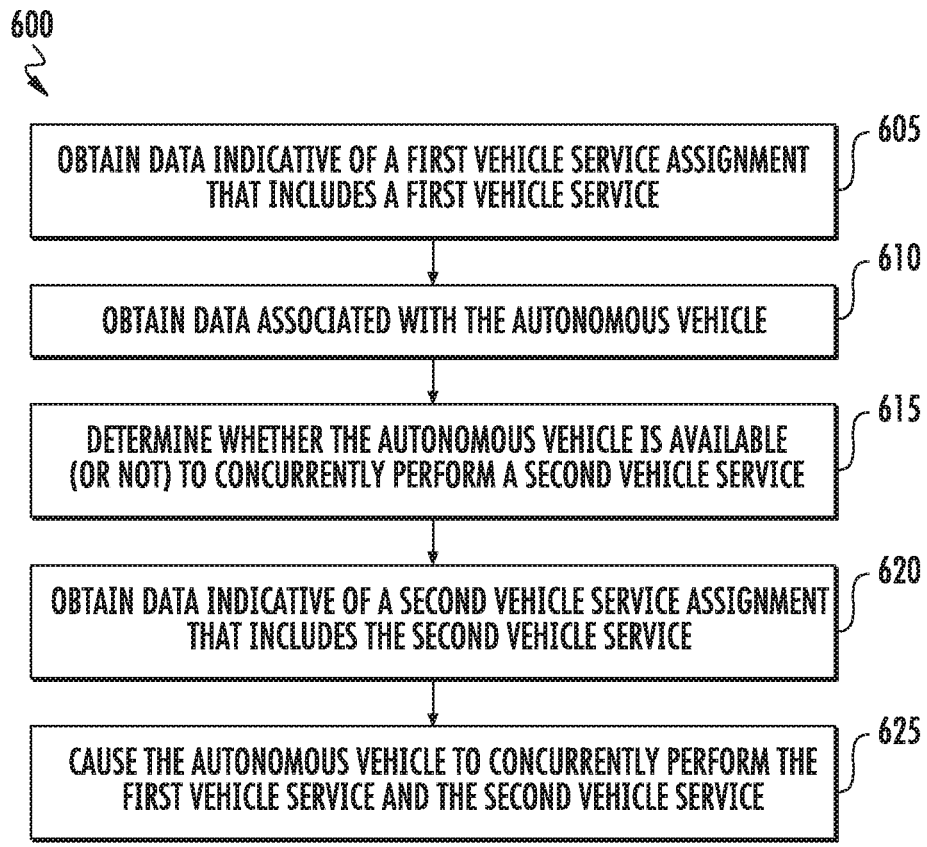
FIG. 6 depicts a flow diagram of an example method for autonomous vehicle control according to example embodiments of the present disclosure.

FIG. 6 depicts a flow diagram of an example method 600 for autonomous vehicle control according to example embodiments of the present disclosure. One or more portion(s) of the method 600 can be implemented by a computing system that includes one or more computing devices such as, for example, the computing systems described with reference to the other figures (e.g., the vehicle computing system 100, a vehicle provider computing system 210, an operations computing system 225A-B, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1-2 and/or 8), for example, to allow autonomous vehicles to pool vehicle services of different service entities. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for example illustrated purposes and is not meant to be limiting. One or more portions of method 600 can be performed additionally, or alternatively, by other systems.

At (605), the method 600 can include obtaining data indicative of a first vehicle service assignment that includes a first vehicle service. For instance, a computing system (e.g., a vehicle computing system 100 onboard an autonomous vehicle 105, a vehicle provider computing system 210 remote from the autonomous vehicle, etc.) can obtain data indicative of a first vehicle service assignment for an autonomous vehicle. The first vehicle service assignment can be associated with a first service entity. The first vehicle service assignment can be indicative of a first vehicle service. As described herein, the data indicative of the first vehicle service assignment can be obtained via a vehicle service assignment queue and/or a remote computing system.

The first vehicle service assignment can be indicative of a variety of information. For example, as described herein, the first vehicle service assignment can be indicative of the type of vehicle service to be performed, one or more locations associated with the vehicle service (e.g., pick-up location, drop-off location, intermediate location(s), etc.), one or more deadlines, a compensation parameter, a willingness for an associated user to allow for vehicle service pooling, etc. Additionally, or alternatively, the first vehicle service assignment can be indicative of a capacity required for the first vehicle service. For example, the first vehicle service can include the transportation of one or more users. The first vehicle service assignment can be indicative of a number of seats that are required for the first vehicle service (e.g., to transport the user(s), etc.). In another example, the first vehicle service can include the delivery of one or more items. The first vehicle service assignment can be indicative of an amount of cargo space that is required for the first vehicle service (e.g., to transport the item(s)).

At (610), the method 600 can include obtaining data associated with the autonomous vehicle. For instance, the computing system (e.g., the vehicle computing system 100, the vehicle provider computing system 210, etc.) can obtain data associated with the autonomous vehicle. The data associated with the autonomous vehicle can include, for example, the size, shape, type, make, model, etc. of the autonomous vehicle. The data associated with the autonomous vehicle can be indicative of a capacity of the autonomous vehicle. This can include the maximum and/or available number of seats (e.g., with seat belts), cargo space, etc.

In some implementations, the data associated with the autonomous vehicle can include sensor data. The computing system can obtain the data associated with the autonomous vehicle by obtaining the sensor data via at least one onboard sensor of the autonomous vehicle (e.g., an interior camera of the autonomous vehicle, a weight sensor of the autonomous vehicle, etc.). The computing system can determine the maximum and/or available capacity of the autonomous vehicle based at least in part on the sensor data.

At (615), the method 600 can include determining whether the autonomous vehicle is available (or not) to concurrently perform one or more second vehicle services. For instance, the computing system can determine that the autonomous vehicle is available to perform a second vehicle service concurrently with the first vehicle service based at least in part on the first vehicle service assignment and/or the data associated with the autonomous vehicle. By way of example, the vehicle computing system can determine that the first vehicle service assignment requests the delivery of an item by a deadline that is several hours into the future and only requires the use of the trunk space in the autonomous vehicle. Accordingly, the vehicle computing system can determined that the autonomous vehicle would be available to perform a second vehicle service concurrently with the delivery of this item such as, for example, the transportation of one or more users that do not require the trunk space of the autonomous vehicle.

The computing system can determine whether the autonomous vehicle is available to perform a second vehicle service prior to and/or after the vehicle begins performing the first vehicle service. For instance, the computing system can cause the autonomous vehicle to travel for the first vehicle service prior to determining that the autonomous vehicle is available to perform a second vehicle service concurrently with the first vehicle service.

At (620), the method 600 can include obtaining data indicative of a second vehicle service assignment that includes the second vehicle service. The computing system can obtain data indicative of a second vehicle service assignment for the autonomous vehicle. The second vehicle service assignment can be associated with a second service entity that is different than the first service entity. For example, the second service entity can be a separate company than the first service entity. The second vehicle service assignment can be indicative of a second vehicle service. In some implementations, the first vehicle service can be a same type of vehicle service as the second vehicle service. In some implementations, the first vehicle service can be a different type of vehicle service than the second vehicle service.

The computing system can select the second vehicle service assignment based at least in part on a plurality of candidate vehicle service assignments. For example, the computing system can access a vehicle service assignment queue to determine whether the autonomous vehicle would be able to address any of the candidate vehicle service assignments in the queue concurrently with the first vehicle service assignment. At least one of the candidate vehicle service assignments can be indicative of a second vehicle service, which can be performed concurrently with the first vehicle service of the first vehicle service assignment. In some implementations, the computing system can obtain data indicative of one or more candidate vehicle service assignments from one or more computing systems that are remote from the autonomous vehicle (e.g., an operations computing system 225A-B, etc.).

At (625), the method 600 can include causing the autonomous vehicle to concurrently perform the first vehicle service and the second vehicle service. The computing system can cause the autonomous vehicle to concurrently perform the first vehicle service of the first vehicle service assignment with the second vehicle service of the second vehicle service assignment. For instance, subsequent to selecting the second vehicle service assignment, the computing system can cause the autonomous vehicle to travel for the second vehicle service concurrently with the first vehicle service. By way of example, the computing system (e.g., a vehicle computing system 100) can cause the autonomous vehicle to initiate a motion control in accordance with the first vehicle service assignment and the second vehicle service assignment (e.g., to concurrently transport at least one of a first user or a first item for the first vehicle service with at least one of a second user or a second item for the second vehicle service). In some implementations, the computing system (e.g., a vehicle provider computing system 210) can communicate data (e.g., over a wireless network) to cause the autonomous vehicle to initiate such a motion control.

When causing the autonomous vehicle 105 to initiate a motion control, the vehicle computing system 100 can plan the motion of the autonomous vehicle 105 such that it generates and traverses an improved vehicle route. For instance, the vehicle computing system 100 can cause the autonomous vehicle to initiate a motion control in accordance with the first vehicle service assignment and the second vehicle service assignment. This motion control can cause the autonomous vehicle 105 to traverse a route by which the autonomous vehicle 105 can travel to and arrive at the origin location(s) for the first, second, and/or third vehicle service assignments as well as the destination location(s) for the first, second, and/or third vehicle service assignments. The intermediate portion of the route for completing the vehicle service assignments (e.g., the waypoints associated therewith) can include at least some overlap. In this way, the motion of the autonomous vehicle 105 can be controlled via the at least somewhat overlapping route for currently addressing at least two vehicle service assignments.

Figure 7:
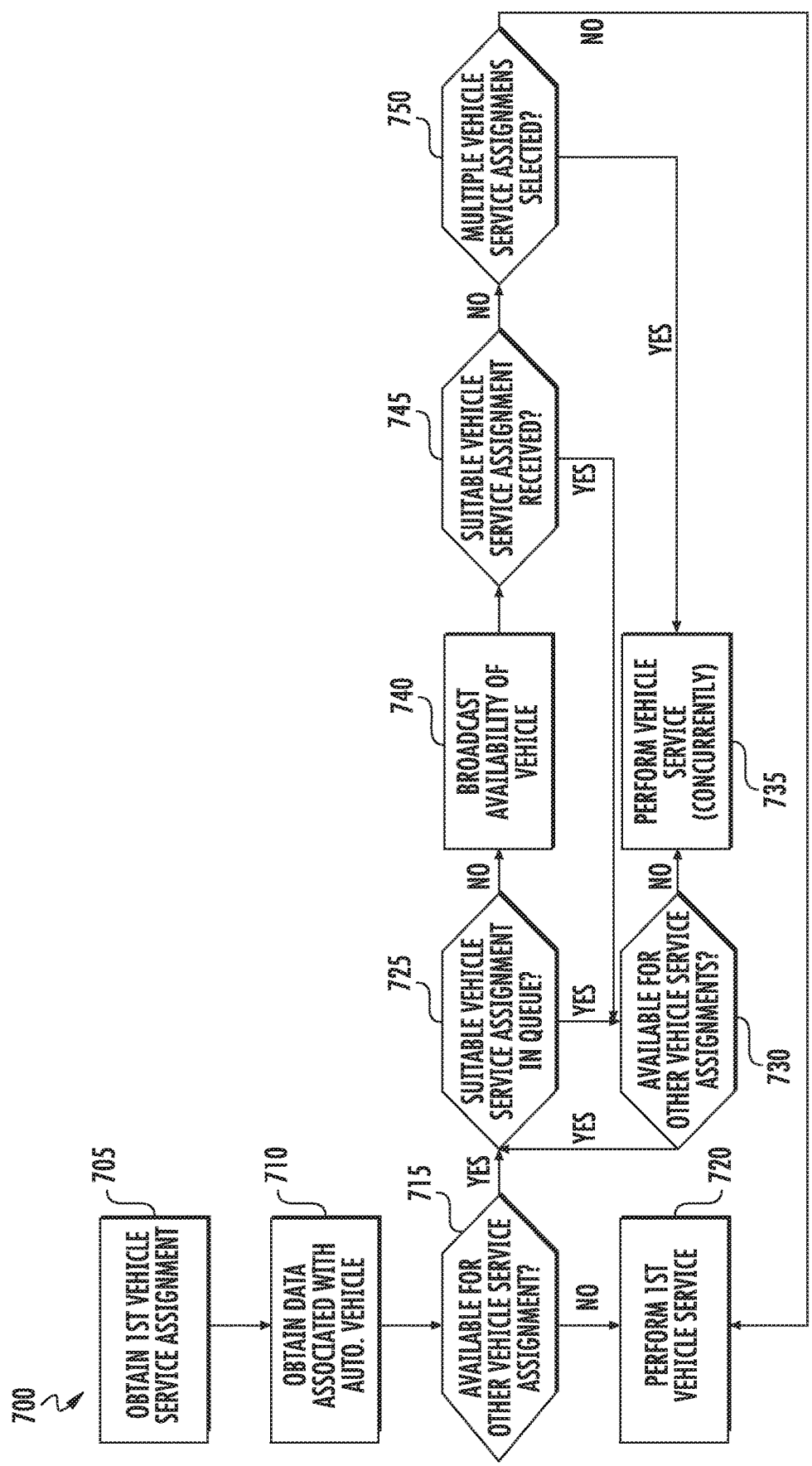
FIG. 7 depicts a flow diagram of another example method for autonomous vehicle control according to example embodiments of the present disclosure.

FIG. 7 depicts a flow diagram of an example method 700 for autonomous vehicle control according to example embodiments of the present disclosure. One or more portion(s) of the method 700 can be implemented by a computing system that includes one or more computing devices such as, for example, the computing systems described with reference to the other figures (e.g., the vehicle computing system 100, a vehicle provider computing system 210, an operations computing system 225A-B, etc.). Each respective portion of the method 700 can be performed by any (or any combination) of one or more computing devices. Moreover, the flow chart of FIG. 7 can represent computer logic for pooling vehicle services across different service entities. One or more portion(s) of the method 600 can be implemented as an algorithm on the hardware components of the device(s) described herein (e.g., as in FIGS. 1-2 and/or 8), for example, to allow autonomous vehicles to pool vehicle services of different service entities. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for example illustrated purposes and is not meant to be limiting. One or more portions of method 700 can be performed additionally, or alternatively, by other systems.

At (705), a computing system associated with an autonomous vehicle (e.g., a vehicle computing system 100, a vehicle provider computing system 210, etc.) can obtain data indicative of first vehicle service assignment. As described herein, the first vehicle service assignment can be associated with a first service entity and indicative of a first vehicle service. By way of example, the first vehicle service assignment can be associated with a delivery service request (e.g., made through a mobile app, etc.) that seeks to have a vehicle transport a package from a pick-up location to a destination location.

At (710), the computing system can obtain data associated with the autonomous vehicle. For instance, the computing system can obtain data indicative of the vehicle's maximum capacity (e.g., from an onboard memory, remote computing system, etc.) and/or available capacity. As described herein, the computing system can obtain sensor data to determine the maximum and/or available capacity of the autonomous vehicle.

At (715), the computing system can determine whether the autonomous vehicle is available or is unavailable to perform one or more second vehicle services concurrently with the first vehicle service. This determination can be based at least in part on the first vehicle service assignment and/or the data associated with the autonomous vehicle. For example, the computing system can analyze the locations, time deadlines, needed capacity, etc. associated with the first vehicle service and/or the capacity of the autonomous vehicle to determine whether the autonomous vehicle would be available to perform at least a portion of the first vehicle service at the same time as at least a portion of the second vehicle service. If the autonomous vehicle is not available, the autonomous vehicle can address the first vehicle service assignment without concurrently addressing any other vehicle service assignment, at (720).

In the event that the autonomous vehicle is available to concurrently perform a second vehicle service with the first vehicle service, the computing system can determine whether there are any suitable candidate vehicle service assignments for the autonomous vehicle, at (725). For example, the computing system can access a vehicle service assignment queue to determine if any of the candidate vehicle service assignments stored therein could be performed concurrently with the first vehicle service of the first vehicle service assignment. If so, the computing system can select one of the candidate vehicle service assignments and accept it as a second vehicle service assignment for the autonomous vehicle. At (730), the computing system can determine whether the autonomous vehicle would be available to perform any additional vehicle services (in addition to the selected second vehicle service assignment). This determination can be based at least in part on the first vehicle service assignment, the second vehicle service assignment, and/or the data associated with the autonomous vehicle (e.g., the available capacity of the autonomous vehicle in light of the first and second vehicle service assignments). In the event that the autonomous vehicle is available, the computing system can continue to analyze the vehicle service assignment queue to see if there is another vehicle service assignment that the autonomous vehicle could perform concurrently with the first and/or second vehicle service. In the event that the autonomous vehicle is not available for another vehicle service (e.g., a third vehicle service), the autonomous vehicle can concurrently perform the selected vehicle services, at (735).

In the event that the vehicle service assignment queue does not include a second (and/or third, etc.) vehicle service assignment for the autonomous vehicle, the computing system can broadcast the availability of the autonomous vehicle, at (740). For instance, the computing system can communicate data indicative of the availability of the autonomous vehicle to concurrently perform another vehicle service with the first (and/or second) vehicle service to one or more service entities (e.g., the associated operations computing system(s)). Additionally, or alternatively, the computing system can communicate data indicative of the availability of the autonomous vehicle to concurrently perform another vehicle service with the first (and/or second) vehicle service to one or more vehicle providers (e.g., the associated vehicle provider computing system(s)).

At (745), the computing system can determine whether it obtained any candidate vehicle service assignment(s) (e.g., from the service entities and/or vehicle providers) that would be suitable for the autonomous vehicle to perform concurrently with another vehicle service. For example, the computing system can determine whether the any candidate vehicle service assignment(s) (e.g., obtained from the service entities and/or vehicle providers) would require a capacity of the vehicle that is less than or equal to the available capacity of the autonomous vehicle in light of the first (and/or second) vehicle service assignments.

In the event that the computing system determines that there is another vehicle service assignment that the autonomous vehicle can address concurrently with one or more of the other vehicle service assignments currently pending with the vehicle, the computing system can continue to attempt to pool further vehicle service assignments (e.g., returning to (730)). In the event that the computing system does not find another suitable vehicle service assignment for the autonomous vehicle (e.g., that fits the vehicle's available capacity), the computing system can determine whether the autonomous vehicle is to perform multiple vehicle service assignments, at (750). If yes, the autonomous vehicle can concurrently perform the vehicle services of at least two of those vehicle service assignments (e.g., by initiating a motion control to traverse an improved vehicle route, etc.), at (735). If no, the autonomous vehicle can perform the vehicle service of the first vehicle service assignment, at (720).

Figure 8:
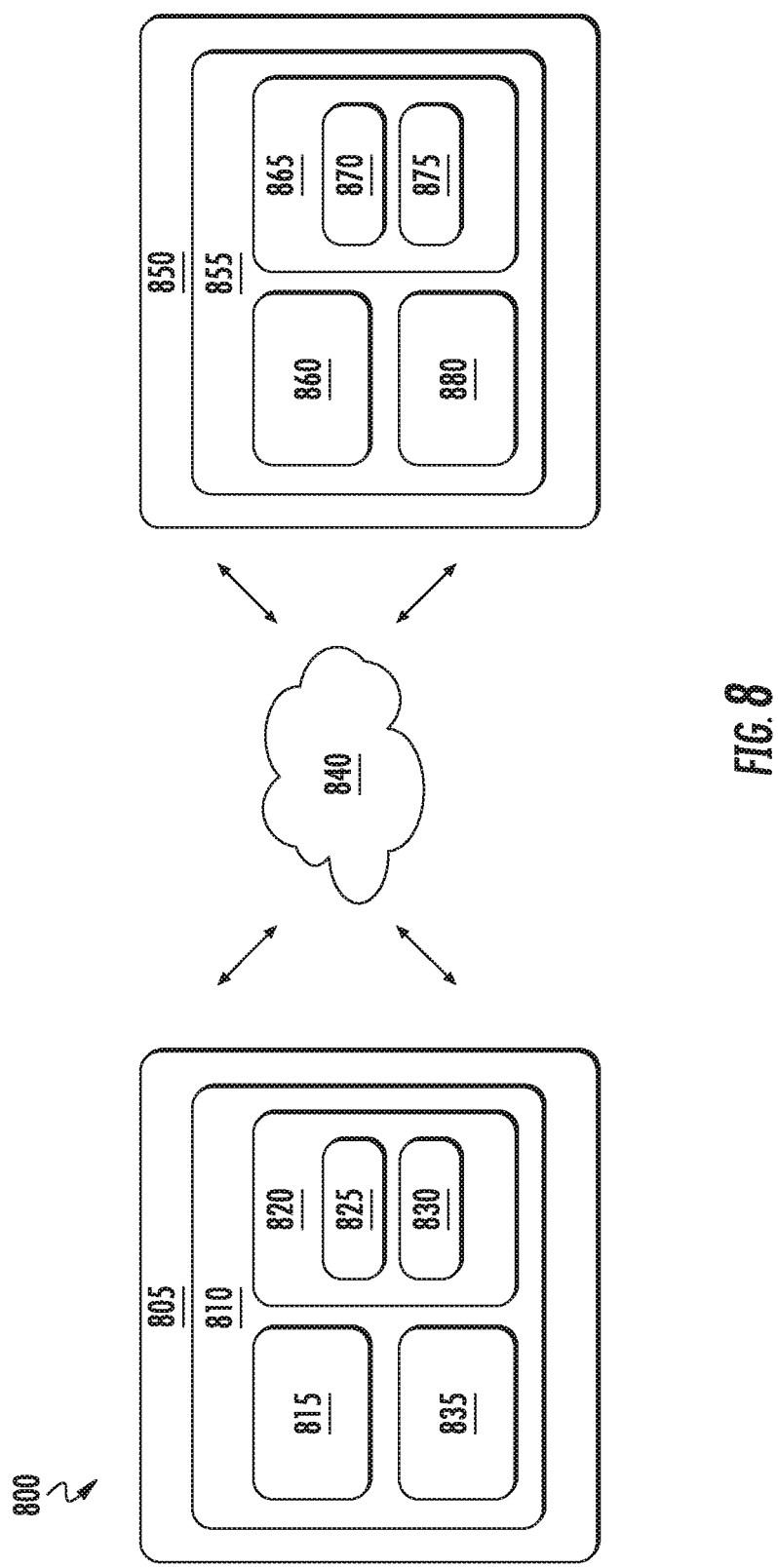
FIG. 8 depicts example system components according to example embodiments of the present disclosure.

FIG. 8 depicts an example system 800 according to example embodiments of the present disclosure. The example system 800 illustrated in FIG. 8 is provided as an example only. The components, systems, connections, and/or other aspects illustrated in FIG. 8 are optional and are provided as examples of what is possible, but not required, to implement the present disclosure. The example system 800 can include a vehicle computing system 805 of a vehicle. The vehicle computing system 805 can represent/correspond to the vehicle computing systems described herein (e.g., vehicle computing system 100). The example system 800 can include a remote computing system 850 (e.g., that is remote from the vehicle computing system). The remote computing system 850 can represent/correspond to, for example, any of the computing systems that are remote from the vehicle described herein (e.g., operations computing system(s) (e.g., 225A-B), vehicle provider computing system(s), 210, etc.). The vehicle computing system 805 and the remote computing system 850 can be communicatively coupled to one another over one or more network(s) 840.

The computing device(s) 810 of the vehicle computing system 805 can include processor(s) 815 and a memory 820. The one or more processors 815 can be any suitable processing device (e.g., a processor core, a microprocessor, an ASIC, a FPGA, a controller, a microcontroller, etc.) and can be one processor or a plurality of processors that are operatively connected. The memory 820 can include one or more non-transitory computer-readable storage media, such as RAM, ROM, EEPROM, EPROM, one or more memory devices, flash memory devices, data registrar, etc., and combinations thereof.

The memory 820 can store information that can be accessed by the one or more processors 815. For instance, the memory 820 (e.g., one or more non-transitory computer-readable storage mediums, memory devices) on-board the vehicle can include computer-readable instructions 825 that can be executed by the one or more processors 815. The instructions 825 can be software written in any suitable programming language or can be implemented in hardware. Additionally, or alternatively, the instructions 825 can be executed in logically and/or virtually separate threads on processor(s) 815.

For example, the memory 820 can store instructions 825 that when executed by the one or more processors 815 cause the one or more processors 815 (the vehicle computing system 805) to perform operations such as any of the operations and functions of the vehicle computing system 100 (or for which it is configured), one or more of the operations and functions of the vehicle provider computing system (or for which it is configured), one or more of the operations and functions of the operations computing systems described herein (or for which it is configured), one or more of the operations and functions for pooling vehicle services across different entities, one or more portions of the methods 600 and/or 700, and/or one or more of the other operations and functions of the computing systems described herein.

The memory 820 can store data 830 that can be obtained (e.g., acquired, received, retrieved, accessed, created, stored, written, manipulated, etc.). The data 830 can include, for instance, sensor data, map data, vehicle state data, perception data, prediction data, motion planning data, data associated with a vehicle client, data associated with a service entity's telecommunications network, data associated with an API, data associated with a library, data associated with library parameters, data associated with vehicle service assignments, data associated with a vehicle service assignment queue, data associated with an autonomous vehicle (e.g., capacity data, etc.), data associated with acceptances and/or rejections of vehicle service assignments, and/or other data/information such as, for example, that described herein. In some implementations, the computing device(s) 810 can obtain data from one or more memories that are remote from the vehicle computing system 805.

The computing device(s) 810 can also include a communication interface 835 used to communicate with one or more other system(s) on-board a vehicle and/or a remote computing device that is remote from the vehicle (e.g., of the remote computing system 850). The communication interface 835 can include any circuits, components, software, etc. for communicating via one or more networks (e.g., network(s) 840). The communication interface 835 can include, for example, one or more of a communications controller, receiver, transceiver, transmitter, port, conductors, software and/or hardware for communicating data.

The remote computing system 850 can include one or more computing device(s) 855 that are remote from the vehicle computing system 805. The computing device(s) 855 can include one or more processors 860 and a memory 865. The one or more processors 860 can be any suitable processing device (e.g., a processor core, a microprocessor, an ASIC, a FPGA, a controller, a microcontroller, etc.) and can be one processor or a plurality of processors that are operatively connected. The memory 865 can include one or more tangible, non-transitory computer-readable storage media, such as RAM, ROM, EEPROM, EPROM, one or more memory devices, flash memory devices, data registrar, etc., and combinations thereof.

The memory 865 can store information that can be accessed by the one or more processors 860. For instance, the memory 865 (e.g., one or more tangible, non-transitory computer-readable storage media, one or more memory devices, etc.) can include computer-readable instructions 870 that can be executed by the one or more processors 860. The instructions 870 can be software written in any suitable programming language or can be implemented in hardware. Additionally, or alternatively, the instructions 870 can be executed in logically and/or virtually separate threads on processor(s) 860.

For example, the memory 865 can store instructions 870 that when executed by the one or more processors 860 cause the one or more processors 860 to perform operations such as any of the operations and functions of the operations computing systems described herein, any of the operations and functions of the vehicle provider computing systems described, any of the operations and functions for which the operations computing systems and/or the vehicle provider computing systems are configured, one or more of the operations and functions of the vehicle computing system (or which for it is configured) as described herein, one or more of the operations and functions for pooling vehicle services across different service entities, one or more portions of the methods 600 and/or 700, and/or one or more of the other operations and functions described herein.

The memory 865 can store data 875 that can be obtained. The data 875 can include, for instance, data associated with service requests, communications associated with/provided by vehicles, data to be communicated to vehicles, application programming interface data, data associated with autonomous vehicles, data associated with vehicle service assignments, data associated with acceptances and/or rejections of vehicle service assignments, data associated with different service entities, data associated with fleet(s) of vehicles, and/or other data/information such as, for example, that described herein. In some implementations, the computing device(s) 855 can obtain data from one or more memories that are remote from the computing system 850 and/or are onboard a vehicle.

The computing device(s) 855 can also include a communication interface 880 used to communicate with one or more system(s) local to and/or remote from the computing system 850. The communication interface 880 can include any circuits, components, software, etc. for communicating via one or more networks (e.g., network(s) 840). The communication interface 880 can include, for example, one or more of a communications controller, receiver, transceiver, transmitter, port, conductors, software and/or hardware for communicating data.

The network(s) 840 can be any type of network or combination of networks that allows for communication between devices. In some embodiments, the network(s) 840 can include one or more of a local area network, wide area network, the Internet, secure network, cellular network, mesh network, peer-to-peer communication link and/or some combination thereof and can include any number of wired or wireless links. Communication over the network(s) 840 can be accomplished, for instance, via a communication interface using any type of protocol, protection scheme, encoding, format, packaging, etc.

Computing tasks, operations, and functions discussed herein as being performed at a vehicle (e.g., via the vehicle computing system) can instead be performed by computing device(s) that are remote from the vehicle (e.g., via a vehicle provider computing system, an operations computing system, etc.), and/or vice versa. Moreover, operations, and functions discussed herein as being performed at a service entity (e.g., via an operations computing system) can instead be performed by other computing device(s) such as those of the vehicle provider computing system. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems may alter the communicated data in some manner before communicating it to another computing system. Moreover, data obtained by a computing system may be manipulated in some manner before it is communicated to another system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for autonomous vehicle control, comprising:
   accessing, by a computing system that comprises one or more computing devices, data indicative of a first vehicle service assignment for an autonomous vehicle from a vehicle assignment queue for the autonomous vehicle, the first vehicle service assignment being received from a first service entity computing platform, and the first vehicle service assignment being indicative of a first vehicle service to be performed by the autonomous vehicle;
   obtaining, by the computing system, data associated with the autonomous vehicle;
   determining, by the computing system, that the autonomous vehicle is available to perform an additional vehicle service concurrently with the first vehicle service based at least in part on the first vehicle service assignment and the data associated with the autonomous vehicle;
   determining, by the computing system, that the vehicle assignment queue does not indicate any vehicle services that the autonomous vehicle is available to perform concurrently with the first vehicle service;
   sending, by the computing system, a communication to a second service entity computing platform that is different than the first service entity computing platform, the communication requesting at least one vehicle service assignment;
   after sending the communication to the second service entity computing platform, receiving, by the computing system and from the second service entity computing platform, data indicative of a second vehicle service assignment for the autonomous vehicle, the second vehicle service assignment being indicative of a second vehicle service to be performed by the autonomous vehicle; and
   causing, by the computing system, the autonomous vehicle to concurrently perform the first vehicle service of the first vehicle service assignment with the second vehicle service of the second vehicle service assignment.

2. The computer-implemented method of claim 1, wherein the data associated with the autonomous vehicle is indicative of a capacity of the autonomous vehicle.

3. The computer-implemented method of claim 2, wherein the data associated with the autonomous vehicle comprises sensor data, and wherein obtaining the data associated with the autonomous vehicle comprises obtaining the sensor data via at least one of an interior camera of the autonomous vehicle or a weight sensor of the autonomous vehicle.

4. The computer-implemented method of claim 1, wherein the first vehicle service assignment is indicative of a number of seats that are required for the first vehicle service.

5. The computer-implemented method of claim 1, wherein the first vehicle service assignment is indicative of an amount of cargo space that is required for the first vehicle service.

6. The computer-implemented method of claim 1, wherein the first vehicle service is a same type of vehicle service as the second vehicle service.

7. The computer-implemented method of claim 1, wherein the first vehicle service is a different type of vehicle service than the second vehicle service.

8. The computer-implemented method of claim 1, wherein the computing system is onboard the autonomous vehicle.

9. The computer-implemented method of claim 1, wherein causing the autonomous vehicle to concurrently perform the first vehicle service of the first vehicle service assignment with the second vehicle service of the second vehicle service assignment comprises:
    causing the autonomous vehicle to initiate a motion control to concurrently transport at least one of a first user or a first item for the first vehicle service with at least one of a second user or a second item for the second vehicle service.

10. A computing system comprising:
    one or more processors; and
    one or more tangible, non-transitory, computer readable media that collectively store instructions that when executed by the one or more processors cause the computing system to perform operations comprising:
        accessing data indicative of a first vehicle service assignment for an autonomous vehicle from a vehicle assignment queue for the autonomous vehicle, the first vehicle service assignment being received from a first service entity computing platform, and the first vehicle service assignment being indicative of a first vehicle service to be performed by the autonomous vehicle;
        determining that the autonomous vehicle is available to perform an additional vehicle service concurrently with the first vehicle service based at least in part on the first vehicle service assignment;
        determining, by the computing system, that the vehicle assignment queue does not indicate any vehicle services that the autonomous vehicle is available to perform concurrently with the first vehicle service;
        sending, by the computing system, a communication to a second service entity computing platform that is different than the first service entity computing platform, the communication requesting at least one vehicle service assignment;
        after sending the communication to the second service entity computing platform, receiving data indicative of a second vehicle service assignment for the autonomous vehicle from the second service entity computing platform, the second vehicle service assignment being indicative of a second vehicle service to be performed by the autonomous vehicle;
        determining that the autonomous vehicle is unavailable to perform the second vehicle service concurrently with the first vehicle service; and
        causing the autonomous vehicle to perform the first vehicle service of the first vehicle service assignment without concurrently performing the second vehicle service.

11. The computing system of claim 10, wherein the operations further comprise accepting the first vehicle service assignment for the autonomous vehicle.

12. The computing system of claim 11, wherein determining whether the autonomous vehicle is available or is unavailable to perform the second vehicle service concurrently with the first vehicle service comprises:
    determining whether the autonomous vehicle is available or is unavailable to perform the second vehicle service concurrently with the first vehicle service prior to accepting the first vehicle service assignment for the autonomous vehicle.

13. The computing system of claim 10, wherein the operations further comprise obtaining data indicative of a capacity of the autonomous vehicle.

14. The computing system of claim 13, wherein the data indicative of the capacity of the autonomous vehicle is obtained via one or more sensors located onboard the autonomous vehicle.

15. The computing system of claim 13, wherein determining whether the autonomous vehicle is available or is unavailable to perform the second vehicle service concurrently with the first vehicle service comprises:
    determining whether the autonomous vehicle is available or is unavailable to perform the second vehicle service concurrently with the first vehicle service based at least in part on the data indicative of the capacity of the autonomous vehicle.

16. An autonomous vehicle comprising:
    one or more processors; and
    one or more tangible, non-transitory, computer readable media that collectively store instructions that when executed by the one or more processors cause the one or more processors to perform operations comprising:
        accessing data indicative of a first vehicle service assignment for the autonomous vehicle from a vehicle assignment queue for the autonomous vehicle, the first vehicle service assignment being received from a first service entity computing platform, and the first vehicle service assignment being indicative of a first vehicle service to be performed by the autonomous vehicle;
        determining that the autonomous vehicle is available to perform an additional vehicle service concurrently with the first vehicle service based at least in part on the first vehicle service assignment;
        determining that the vehicle assignment queue does not indicate any vehicle services that the autonomous vehicle is available to perform concurrently with the first vehicle service;
        sending a communication to a second service entity computing platform that is different than the first service entity computing platform, the communication requesting at least one vehicle service assignment;
        after sending the communication to the second service entity computing platform, receiving, from the second service entity computing platform, data indicative of a plurality of candidate vehicle service assignments;

selecting a second vehicle service assignment for the autonomous vehicle based at least in part on one or more of the plurality of candidate vehicle service assignments; and causing the autonomous vehicle to concurrently perform the first vehicle service of the first vehicle service assignment with a second vehicle service indicated by the second vehicle service assignment.

17. The autonomous vehicle of claim 16, wherein causing the autonomous vehicle to concurrently perform the first vehicle service of the first vehicle service assignment with the second vehicle service of the second vehicle service assignment comprises:

causing the autonomous vehicle to travel for the first vehicle service prior to determining that the autonomous vehicle is available to perform the second vehicle service concurrently with the first vehicle service, and subsequent to selecting the second vehicle service assignment, causing the autonomous vehicle to travel for the second vehicle service concurrently with the first vehicle service.

18. The autonomous vehicle of claim 17, wherein the first vehicle service is a delivery service and the second vehicle service is a transportation service, and wherein the autonomous vehicle begins to transport an item in accordance with the delivery service prior to one or more users boarding the autonomous vehicle for the transportation service.

19. The autonomous vehicle of claim 18, wherein causing the autonomous vehicle to perform the first vehicle service of the first vehicle service assignment concurrently with the second vehicle service of the second vehicle service assignment comprises:

causing the autonomous vehicle to initiate a motion control to transport the item during at least a portion of a time that the one or more users occupy the autonomous vehicle.

\* \* \* \* \*